US012739777B2

(12) United States Patent
Fischer et al.

(10) Patent No.: US 12,739,777 B2
(45) Date of Patent: Sep. 15, 2026

(54) SIGNALING AND PROCEDURES FOR SUPPORTING REFERENCE LOCATION DEVICES

(71) Applicant: QUALCOMM Incorporated, San Diego, CA (US)

(72) Inventors: Sven Fischer, Nuremberg (DE); Stephen William Edge, Escondido, CA (US); Sony Akkarakaran, Poway, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 18/262,245

(22) PCT Filed: Feb. 2, 2022

(86) PCT No.: PCT/US2022/070471

§ 371 (c)(1),
(2) Date: Jul. 20, 2023

(87) PCT Pub. No.: WO2022/212973

PCT Pub. Date: Oct. 6, 2022

(65) Prior Publication Data

US 2024/0073853 A1 Feb. 29, 2024

(30) Foreign Application Priority Data

Mar. 30, 2021 (GR) .............................. 20210100208

(51) Int. Cl.
*H04W 64/00* (2009.01)
*G01S 5/02* (2010.01)

(52) U.S. Cl.
CPC ............ *H04W 64/00* (2013.01); *G01S 5/021* (2013.01)

(58) Field of Classification Search
None
See application file for complete search history.

(56) References Cited

U.S. PATENT DOCUMENTS 10,869,315 B2 12/2020 Cheng et al.
2013/0080769 A1 3/2013 Cha et al.
(Continued)

FOREIGN PATENT DOCUMENTS

EP 3923501 A1 12/2021
WO WO-2019168908 9/2019
WO 2020164514 A1 8/2020

OTHER PUBLICATIONS

European Search Report—EP22706216—Search Authority—The Hague—Jun. 26, 2024.
(Continued)

*Primary Examiner* — Suhail Khan
(74) *Attorney, Agent, or Firm* — Muncy, Geissler, Olds & Lowe, P.C./QUALCOMM Incorporated

(57) ABSTRACT

Disclosed are techniques for communication. In an aspect, a location server receives, from a network entity serving a reference device, a registration request for the reference device to operate as a reference location device (RLD), the registration request including one or more parameters enabling the location server to communicate with the reference device via a positioning protocol, instigates a positioning procedure with the reference device via the positioning protocol based on the one or more parameters; receives one or more reference positioning measurements from the reference device during the positioning procedure via the positioning protocol; and determines one or more correction terms for positioning one or more user equipments (UEs) based, at least in part, on a location of the reference device and the one or more reference positioning measurements.

10 Claims, 22 Drawing Sheets

(56) References Cited

U.S. PATENT DOCUMENTS

| | | | |
|---|---|---|---|
| 2022/0046490 A1* | 2/2022 | Tripathi | H04W 36/0085 |
| 2023/0308833 A1* | 9/2023 | Yang | G01S 1/042 |
| 2023/0362641 A1 | 11/2023 | Edge et al. | |

OTHER PUBLICATIONS

Huawei et al: "Solution for KI#7: Support of Positioning Reference Units and Reference UEs", 3GPP TSG-RAN SA2 Meeting #150E, S2-2203305, Revision of S2-2202730r01, 3rd Generation Partnership Project, Mobile Competence Centre, 650, Route Des Lucioles, F-06921 Sophia-Antipolis Cedex, France, vol. SA WG2, No. e-meeting, Elbonia, Apr. 6, 2022-Apr. 12, 2022, Apr. 13, 2022, 11 Pages, XP052136168, Chapter 6.X.3 Procedures.

Interdigital Inc: "Discussion on Supporting Positioning Reference Units", 3GPP RAN WG2 Meeting #116bis-e, R2-2201191, 3rd Generation Partnership Project, Mobile Competence Centre, 650, Route Des Lucioles, F-06921 Sophia-Antipolis Cedex, France, vol. RAN WG2, No. Electronic, Jan. 17, 2022-Jan. 25, 2022, Jan. 11, 2022, 4 Pages, XP052094293, Chapter 2 Discussion.

Qualcomm Incorporated: "Signalling and Procedures for Supporting Positioning Reference Units", 3GPP TSG- RAN WG3 Meeting #113-e, R3-213399, 3rd Generation Partnership Project, Mobile Competence Centre, 650, Route Des Lucioles, F-06921 Sophia-Antipolis Cedex, France, vol. RAN WG3, No. Electronic Meeting, Aug. 16, 2021- Aug. 27, 2021, Aug. 5, 2021, 16 Pages, XP052032700, Chapter 5.1.2 Solution 2: PRU Registration using Supplementary Services, Figure 5.

3GPP TS 23.273, 3rd Generation Partnership Project, Technical Specification Group Services and System Aspects, 5G System Location Services (LCS) (Release 16), V0.0.0, Jan. 2019, 11 Pages.

Cewit, et al., "Discussion on Positioning Enhancements for Release 17", 3GPP TSG RAN WG1 103-e, R1-2008718, 3rd Generation Partnership Project, Mobile Competence Centre, 650, Route Des Lucioles, F-06921 Sophia-Antipolis Cedex, France, vol. RAN WG1, No. e-meeting, Oct. 16, 2020-Nov. 13, 2020, Oct. 17, 2020, XP051940317, 8 Pages, p. 3,4, paragraphs 2.3 and 5.

Ericsson: "WF on Positioning Transport for NG-RAN Hosting E-UTRA", 3GPP TSG-RAN WG3 #97, R3-173373_WF, 3rd Generation Partnership Project, Mobile Competence Centre, 650, Route Des Lucioles, F-06921 Sophia-Antipolis Cedex, France, vol. RAN WG3, No. Berlin, Germany, Aug. 21, 2017-Aug. 25, 2017 Aug. 25, 2017, XP051330664, 2 Pages, Section 2.

Huawei et al., "Scope Revision of Rel-17 WI on NR Positioning Enhancements", 3GPP TSG RAN Meeting #91-e, RP-210568, 3rd Generation Partnership Project, Mobile Competence Centre, 650, Route Des Lucioles, F-06921 Sophia-Antipolis Cedex, France, vol. TSG RAN, No. Electronic Meeting, Mar. 16, 2021-Mar. 26, 2021 Mar. 15, 2021, XP051985931, 11 Pages, page 5.

International Search Report and Written Opinion—PCT/US2022/070471—ISA/EPO—Sep. 1, 2022.

Moderator (Ericsson): "Fl Summary #3 for AI 8.5.3 Accuracy Improvements for DL-AoD Positioning", 3GPP TSG-RAN WG1 Meeting #103-e, R1-2102093, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Feb. 5, 2021, XP051977688, 83 Pages, pp. 50-52.

Nokia (Rapporteur) et al., "NR Positioning Stage 2 Corrections", RP-202775, R2-2010882, 3rd Generation Partnership Project, Mobile Competence Centre, 650, Route Des Lucioles, F-06921 Sophia-Antipolis Cedex, France, vol. RAN WG2, No. Electronic, Nov. 2, 2020-Nov. 13, 2020 Dec. 3, 2020, XP051964854, 24 Pages, Sections 5.3.3 and 8.10.3.2.3.

Partial International Search Report—PCT/US2022/070471—ISA/EPO—May 18, 2022.

Qualcomm Incorporated: "Comparison of 5GC-LMF and RAN-LMC Based Positioning", 3GPP Draft, R3-195824_(Local LMF Benefits), 3GPP TSG RAN WG3 Meeting #105bis, 3rd Generation Partnership Project (3GPP), Mobile Competence Centre, 650, Route Des Lucioles, F-06921 Sophia-Antipolis Cedex, France vol. RAN WG3, No. Chongqing, China, Oct. 14, 2019-Oct. 18, 2019, Oct. 4, 2019 (Oct. 4, 2019), XP051810037, 14 Pages, Section 2.3, figures 6, 7, p. 12, paragraph 3. 1, figure 6.

Huawei, et al., "Enhancement to Mitigate gNB and UE Rx/Tx Timing Error", 3GPP TSG RAN WG1 Meeting #104-e, R1-2100195, E-meeting, Jan. 25-Feb. 5, 2021, Jan. 19, 2021, 9 Pages.

* cited by examiner

SIGNALING AND PROCEDURES FOR SUPPORTING REFERENCE LOCATION DEVICES

CROSS-REFERENCE TO RELATED APPLICATIONS

The present application for patent claims priority to Greek Patent Application No. 20210100208, entitled "SIGNALING AND PROCEDURES FOR SUPPORTING REFERENCE LOCATION DEVICES," filed Mar. 30, 2021, and is a national stage application, filed under 35 U.S.C. § 371, of International Patent Application No. PCT/US2022/070471, entitled "SIGNALING AND PROCEDURES FOR SUPPORTING REFERENCE LOCATION DEVICES," filed Feb. 2, 2022, both of which are assigned to the assignee hereof and expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of communication performed by a location server includes receiving, from a network entity serving a reference device, a registration request for the reference device to operate as a reference location device (RLD), the registration request including one or more parameters enabling the location server to communicate with the reference device via a positioning protocol; instigating a positioning procedure with the reference device via the positioning protocol based on the one or more parameters; receiving one or more reference positioning measurements from the reference device during the positioning procedure via the positioning protocol; and determining one or more correction terms for positioning one or more user equipments (UEs) based, at least in part, on a location of the reference device and the one or more reference positioning measurements.

In an aspect, a method of communication performed by a reference device includes transmitting, to a network entity, a registration request for the reference device to operate as a reference location device (RLD), the registration request including one or more parameters indicating a capability of the reference device to operate as the RLD; receiving, from a location server via a positioning protocol, a request to perform one or more reference positioning measurements; performing the one or more reference positioning measurements based on reception of the request; and transmitting the one or more reference positioning measurements to the location server via the positioning protocol.

In an aspect, a method of communication performed by a location server includes sending, to a network entity, a request to transfer one or more first New Radio positioning protocol type A (NRPPa) messages to a radio access network (RAN) node, the one or more first NRPPa message including one or more first Long-Term Evolution (LTE) positioning protocol (LPP) messages, the one or more first LPP messages including a location information request for one or more reference positioning measurements from a reference location device (RLD) at the RAN node; receiving, from the network entity, one or more second NRPPa messages from the RAN node, the one or more second NRPPa messages including one or more second LPP messages, the one or more second LPP messages including at least the one or more reference positioning measurements; and determining one or more correction terms for positioning one or more user equipments (UEs) based, at least in part, on a location of the RLD and the one or more reference positioning measurements.

In an aspect, a method of communication performed by a location server includes sending, to a network entity, a request to transfer one or more first New Radio positioning protocol type A (NRPPa) messages to a radio access network (RAN) node, the one or more first NRPPa message including a request for the RAN node to provide a sounding reference signals (SRS) configuration for transmission of SRS by a reference location device (RLD) at the RAN node; and receiving, from the network entity, one or more second NRPPa messages from the RAN node, the one or more second NRPPa messages including the SRS configuration defining the SRS the RLD at the RAN node transmits.

In an aspect, a location server includes a memory; a communication interface; and at least one processor communicatively coupled to the memory and the communication interface, the at least one processor configured to: receive, via the communication interface, from a network entity serving a reference device, a registration request for the reference device to operate as a reference location device (RLD), the registration request including one or more parameters enabling the location server to communicate with the reference device via a positioning protocol; instigate a positioning procedure with the reference device via the positioning protocol based on the one or more parameters; receive, via the communication interface, one or more reference positioning measurements from the reference device during the positioning procedure via the positioning protocol; and determine one or more correction terms for positioning one or more user equipments (UEs) based, at least in part, on a location of the reference device and the one or more reference positioning measurements.

In an aspect, a reference device includes a memory; a communication interface; and at least one processor communicatively coupled to the memory and the communication interface, the at least one processor configured to: cause the communication interface to transmit, to a network entity, a registration request for the reference device to operate as a reference location device (RLD), the registration request including one or more parameters indicating a capability of the reference device to operate as the RLD; receive, via the communication interface, from a location server via a positioning protocol, a request to perform one or more reference positioning measurements; perform the one or more reference positioning measurements based on reception of the request; and cause the communication interface to transmit the one or more reference positioning measurements to the location server via the positioning protocol.

In an aspect, a location server includes a memory; a communication interface; and at least one processor communicatively coupled to the memory and the communication interface, the at least one processor configured to: cause the communication interface to send, to a network entity, a request to transfer one or more first New Radio positioning protocol type A (NRPPa) messages to a radio access network (RAN) node, the one or more first NRPPa message including one or more first Long-Term Evolution (LTE) positioning protocol (LPP) messages, the one or more first LPP messages including a location information request for one or more reference positioning measurements from a reference location device (RLD) at the RAN node; receive, via the communication interface, from the network entity, one or more second NRPPa messages from the RAN node, the one or more second NRPPa messages including one or more second LPP messages, the one or more second LPP messages including at least the one or more reference positioning measurements; and determine one or more correction terms for positioning one or more user equipments (UEs) based, at least in part, on a location of the RLD and the one or more reference positioning measurements.

In an aspect, a location server includes a memory; a communication interface; and at least one processor communicatively coupled to the memory and the communication interface, the at least one processor configured to: cause the communication interface to send, to a network entity, a request to transfer one or more first New Radio positioning protocol type A (NRPPa) messages to a radio access network (RAN) node, the one or more first NRPPa message including a request for the RAN node to provide a sounding reference signals (SRS) configuration for transmission of SRS by a reference location device (RLD) at the RAN node; and receive, via the communication interface, from the network entity, one or more second NRPPa messages from the RAN node, the one or more second NRPPa messages including the SRS configuration defining the SRS the RLD at the RAN node transmits.

In an aspect, a location server includes means for receiving, from a network entity serving a reference device, a registration request for the reference device to operate as a reference location device (RLD), the registration request including one or more parameters enabling the location server to communicate with the reference device via a positioning protocol; means for instigating a positioning procedure with the reference device via the positioning protocol based on the one or more parameters; means for receiving one or more reference positioning measurements from the reference device during the positioning procedure via the positioning protocol; and means for determining one or more correction terms for positioning one or more user equipments (UEs) based, at least in part, on a location of the reference device and the one or more reference positioning measurements.

In an aspect, a reference device includes means for transmitting, to a network entity, a registration request for the reference device to operate as a reference location device (RLD), the registration request including one or more parameters indicating a capability of the reference device to operate as the RLD; means for receiving, from a location server via a positioning protocol, a request to perform one or more reference positioning measurements; means for performing the one or more reference positioning measurements based on reception of the request; and means for transmitting the one or more reference positioning measurements to the location server via the positioning protocol.

In an aspect, a location server includes means for sending, to a network entity, a request to transfer one or more first New Radio positioning protocol type A (NRPPa) messages to a radio access network (RAN) node, the one or more first NRPPa message including one or more first Long-Term Evolution (LTE) positioning protocol (LPP) messages, the one or more first LPP messages including a location information request for one or more reference positioning measurements from a reference location device (RLD) at the RAN node; means for receiving, from the network entity, one or more second NRPPa messages from the RAN node, the one or more second NRPPa messages including one or more second LPP messages, the one or more second LPP messages including at least the one or more reference positioning measurements; and means for determining one or more correction terms for positioning one or more user equipments (UEs) based, at least in part, on a location of the RLD and the one or more reference positioning measurements.

In an aspect, a location server includes means for sending, to a network entity, a request to transfer one or more first New Radio positioning protocol type A (NRPPa) messages to a radio access network (RAN) node, the one or more first NRPPa message including a request for the RAN node to provide a sounding reference signals (SRS) configuration for transmission of SRS by a reference location device (RLD) at the RAN node; and means for receiving, from the network entity, one or more second NRPPa messages from the RAN node, the one or more second NRPPa messages including the SRS configuration defining the SRS the RLD at the RAN node transmits.

In an aspect, a non-transitory computer-readable medium stores computer-executable instructions that, when executed by a location server, cause the location server to: receive, from a network entity serving a reference device, a registration request for the reference device to operate as a reference location device (RLD), the registration request including one or more parameters enabling the location server to communicate with the reference device via a positioning protocol; instigate a positioning procedure with the reference device via the positioning protocol based on the one or more parameters; receive one or more reference positioning measurements from the reference device during the positioning procedure via the positioning protocol; and determine one or more correction terms for positioning one or more user equipments (UEs) based, at least in part, on a location of the reference device and the one or more reference positioning measurements.

In an aspect, a non-transitory computer-readable medium stores computer-executable instructions that, when executed by a reference device, cause the reference device to: transmit, to a network entity, a registration request for the reference device to operate as a reference location device (RLD), the registration request including one or more parameters indicating a capability of the reference device to operate as the RLD; receive, from a location server via a positioning protocol, a request to perform one or more reference positioning measurements; perform the one or more reference positioning measurements based on reception of the request; and transmit the one or more reference positioning measurements to the location server via the positioning protocol.

In an aspect, a non-transitory computer-readable medium stores computer-executable instructions that, when executed by a location server, cause the location server to: send, to a network entity, a request to transfer one or more first New Radio positioning protocol type A (NRPPa) messages to a radio access network (RAN) node, the one or more first NRPPa message including one or more first Long-Term Evolution (LTE) positioning protocol (LPP) messages, the one or more first LPP messages including a location information request for one or more reference positioning measurements from a reference location device (RLD) at the RAN node; receive, from the network entity, one or more second NRPPa messages from the RAN node, the one or more second NRPPa messages including one or more second LPP messages, the one or more second LPP messages including at least the one or more reference positioning measurements; and determine one or more correction terms for positioning one or more user equipments (UEs) based, at least in part, on a location of the RLD and the one or more reference positioning measurements.

In an aspect, a non-transitory computer-readable medium stores computer-executable instructions that, when executed by a location server, cause the location server to: send, to a network entity, a request to transfer one or more first New Radio positioning protocol type A (NRPPa) messages to a radio access network (RAN) node, the one or more first NRPPa message including a request for the RAN node to provide a sounding reference signals (SRS) configuration for transmission of SRS by a reference location device (RLD) at the RAN node; and receive, from the network entity, one or more second NRPPa messages from the RAN node, the one or more second NRPPa messages including the SRS configuration defining the SRS the RLD at the RAN node transmits.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
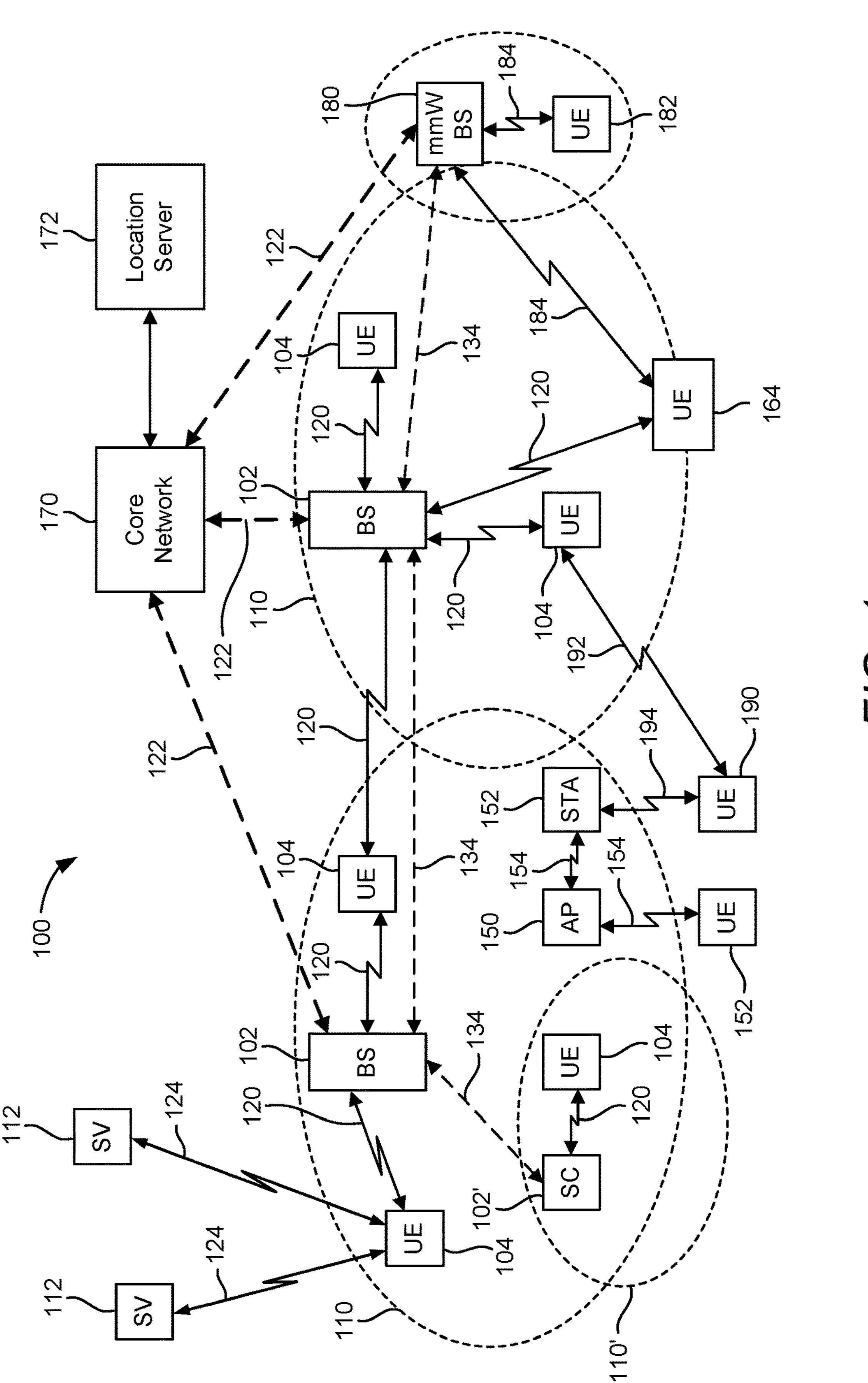
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
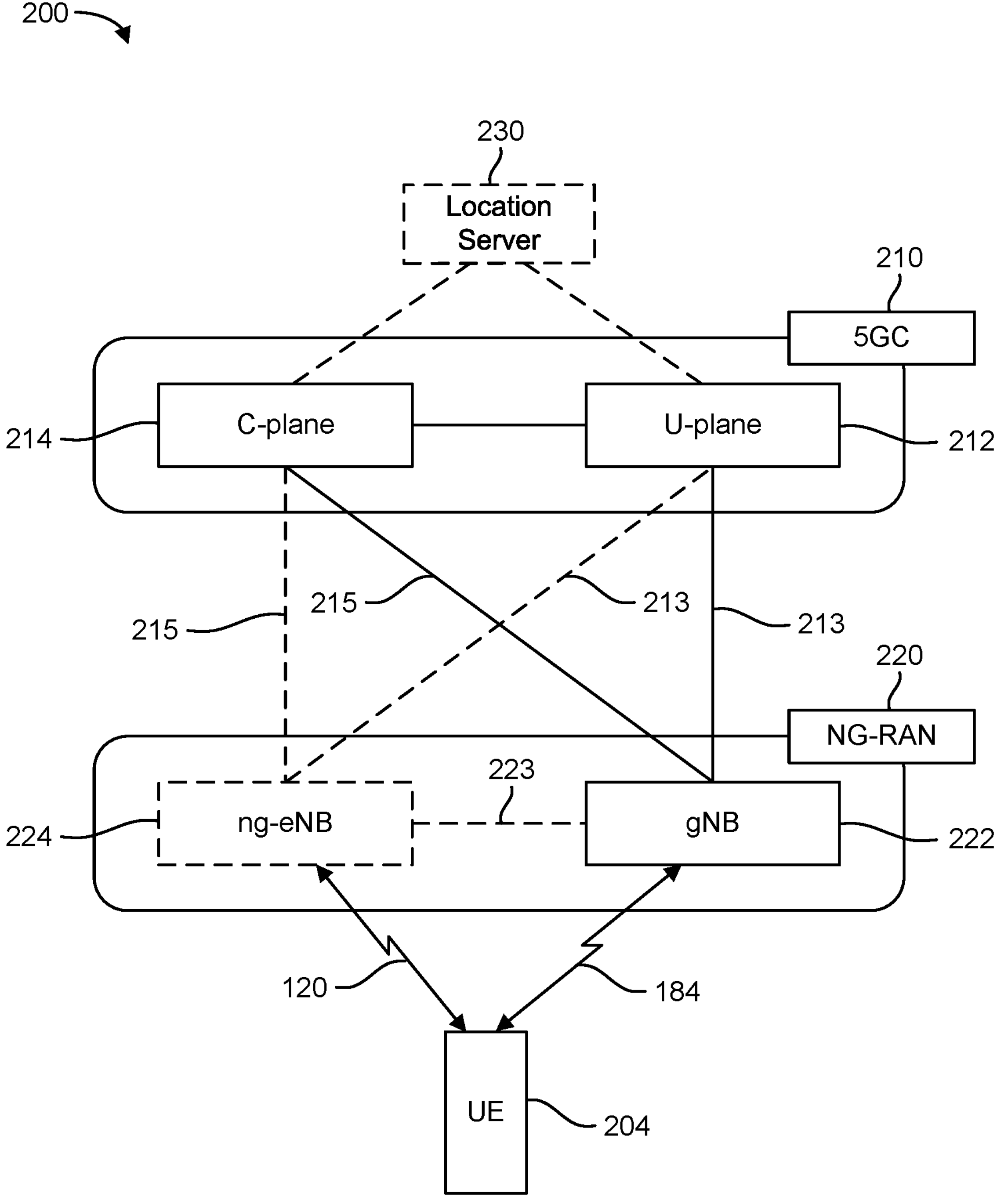
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
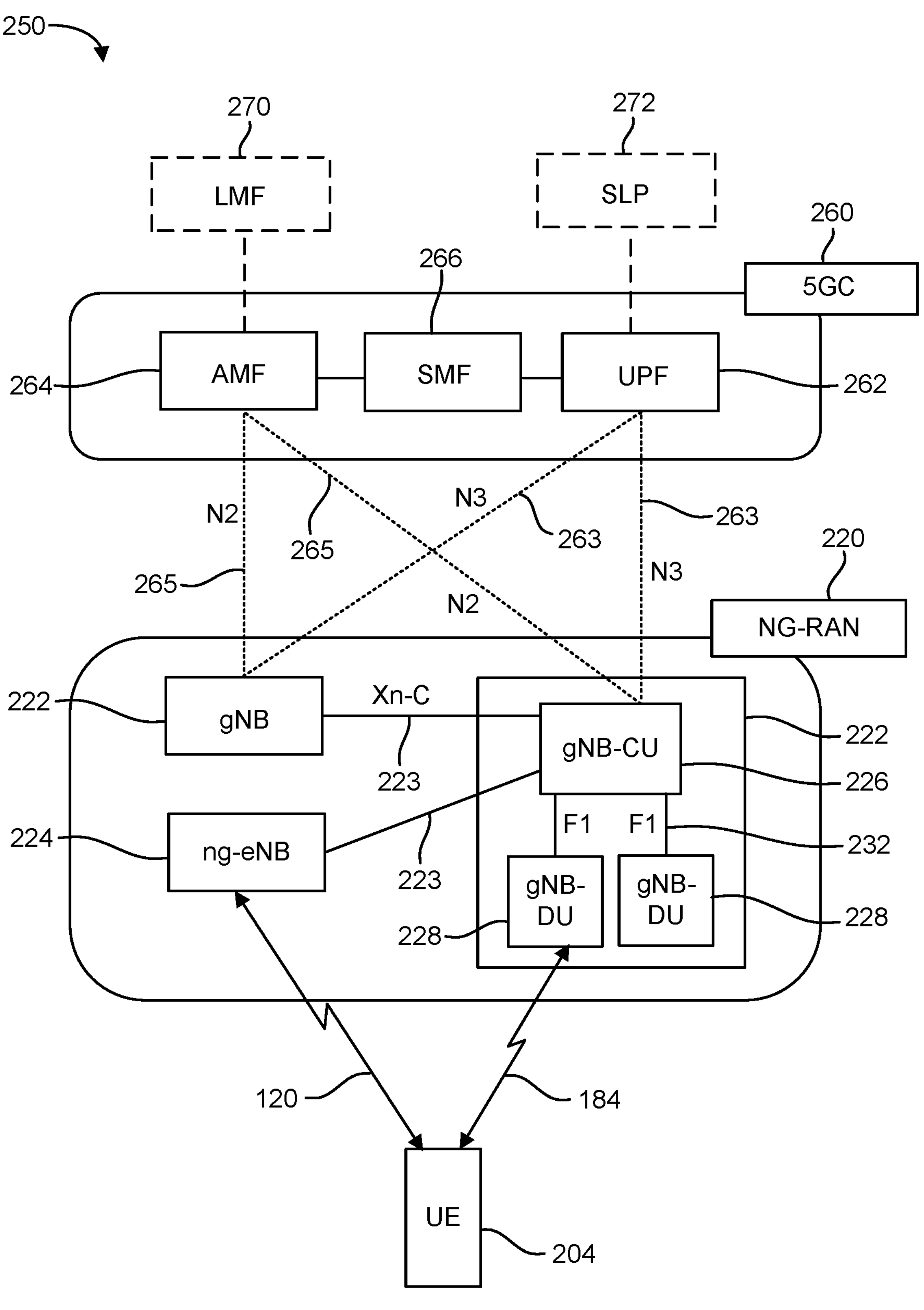

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" or F1 Access Point (F1AP) interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
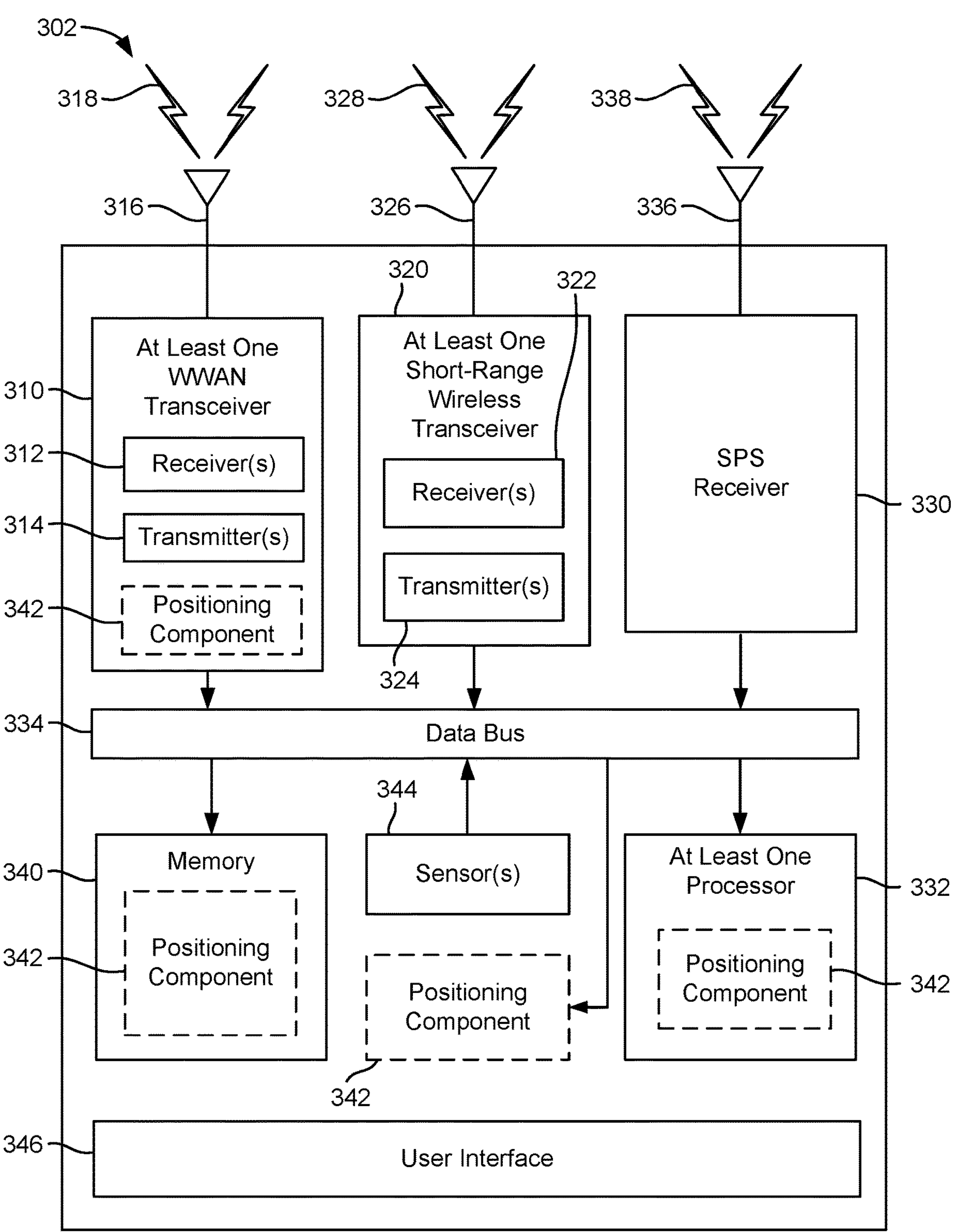
FIGS. 3A to 3C are simplified block diagrams of several sample aspects of components that may be employed in a user equipment (UE), a base station, and a network entity, respectively, and configured to support communications as taught herein.
Figure 3B:
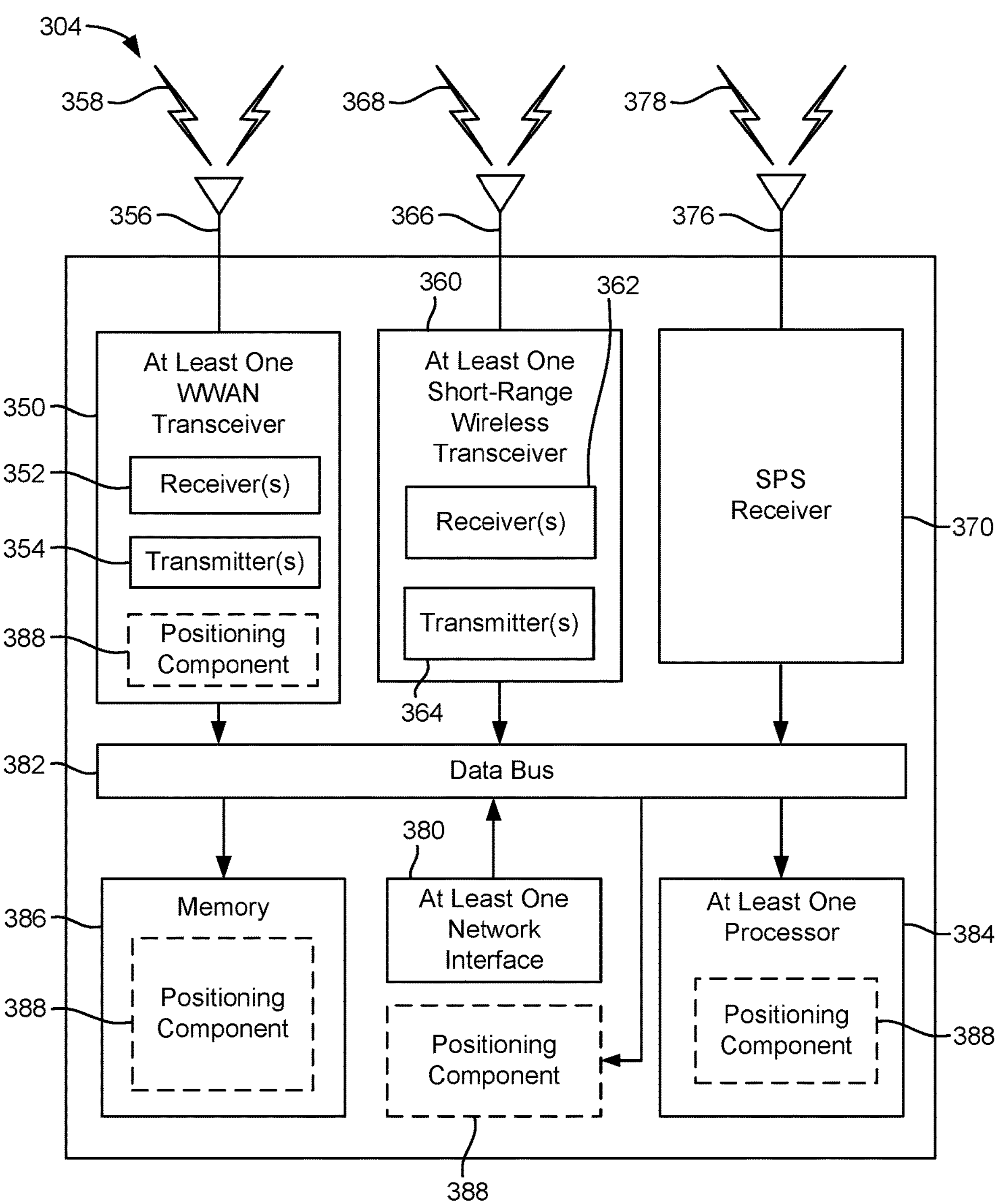
Figure 3C:
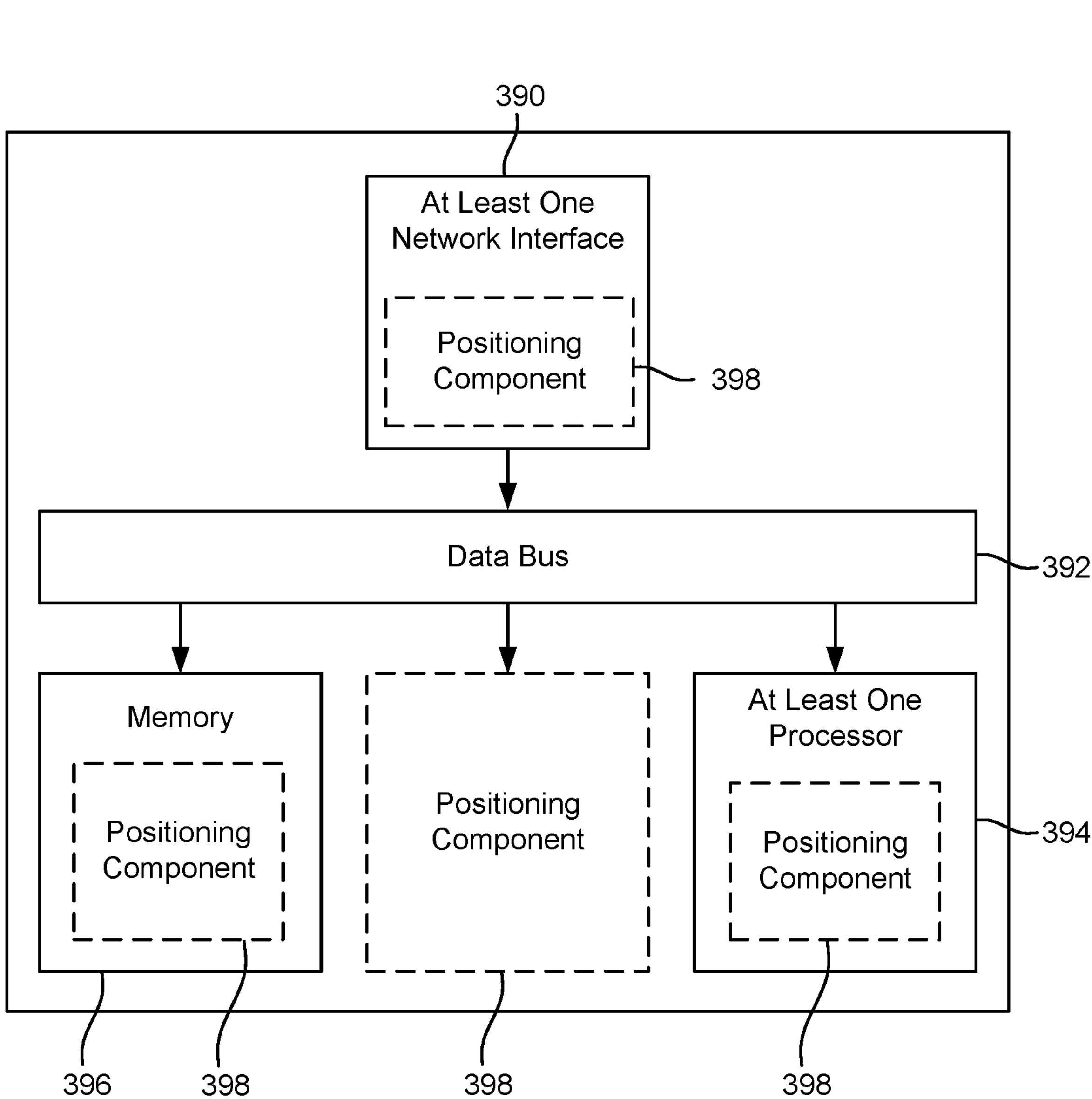

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, at least one short-range wireless transceiver 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interface 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

In an aspect, the at least one WWAN transceiver 310 and/or the at least one short-range wireless transceiver 320 may form a (wireless) communication interface of the UE 302. Similarly, the at least one WWAN transceiver 350, the at least one short-range wireless transceiver 360, and/or the at least one network interface 380 may form a (wireless) communication interface of the base station 304. Likewise, the at least one network interface 390 may form a (wireless) communication interface of the network entity 306. The various wireless transceivers (e.g., transceivers 310, 320, 350, and 360) and wired transceivers (e.g., network interfaces 380 and 390) may generally be characterized as at least one transceiver, or alternatively, as at least one communication interface. As such, whether a particular transceiver or communication interface relates to a wired or wireless transceiver or communication interface, respectively, may be inferred from the type of communication performed (e.g., a backhaul communication between network devices or servers will generally relate to signaling via at least one wired transceiver).

The UE 302, the base station 304, and the network entity 306 also include other components that may be used in conjunction with the operations as disclosed herein. The UE 302, the base station 304, and the network entity 306 include at least one processor 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, at least one general purpose processor, multi-core processor, central processing unit (CPU), ASIC, digital signal processor (DSP), field programmable gate array (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include positioning components 342, 388, and 398, respectively. The positioning components 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning components 342, 388, and 398 may be external to the processors 332, 384, and 394 (e.g., part of a modem processing system, integrated with another processing system, etc.). Alternatively, the positioning components 342, 388, and 398 may be memory modules stored in the memory components 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the at least one WWAN transceiver 310, the memory component 340, the at least one processor 332, or any combination thereof, or may be a standalone component. FIG. 3B illustrates possible locations of the positioning component 388, which may be, for example, part of the at least one WWAN transceiver 350, the memory component 386, the at least one processor 384, or any combination thereof, or may be a standalone component. FIG. 3C illustrates possible locations of the positioning component 398, which may be, for example, part of the at least one network interface 390, the memory component 396, the at least one processor 394, or any combination thereof, or may be a standalone component.

The UE 302 may include one or more sensors 344 coupled to the at least one processor 332 to provide means for sensing or detecting movement and/or orientation information that is independent of motion data derived from signals received by the at least one WWAN transceiver 310, the at least one short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems. In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the at least one processor 384 in more detail, in the downlink, IP packets from the network entity 306 may be provided to the at least one processor 384. The at least one processor 384 may implement functionality for an RRC layer, a packet data convergence protocol (PDCP) layer, a radio link control (RLC) layer, and a medium access control (MAC) layer. The at least one processor 384 may provide RRC layer functionality associated with broadcasting of system information (e.g., master information block (MIB), system information blocks (SIGs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the at least one processor 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the at least one processor 332, which implements Layer-3 (L3) and Layer-2 (L2) functionality.

In the uplink, the at least one processor 332 provides demultiplexing between transport and logical channels, packet reassembly, deciphering, header decompression, and control signal processing to recover IP packets from the core network. The at least one processor 332 is also responsible for error detection.

Similar to the functionality described in connection with the downlink transmission by the base station 304, the at least one processor 332 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the at least one processor 384.

In the uplink, the at least one processor 384 provides demultiplexing between transport and logical channels, packet reassembly, deciphering, header decompression, control signal processing to recover IP packets from the UE 302. IP packets from the at least one processor 384 may be provided to the core network. The at least one processor 384 is also responsible for error detection.

For convenience, the UE 302, the base station 304, and/or the network entity 306 are shown in FIGS. 3A to 3C as including various components that may be configured according to the various examples described herein. It will be appreciated, however, that the illustrated components may have different functionality in different designs.

The various components of the UE 302, the base station 304, and the network entity 306 may communicate with each other over data buses 334, 382, and 392, respectively. In an aspect, the data buses 334, 382, and 392 may form, or be part of, the communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A to 3C may be implemented in various ways. In some implementations, the components of FIGS. 3A to 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memory components 340, 386, and 396, the positioning components 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-triptime (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, a UE performs an RTT procedure with multiple base stations to enable its location to be determined (e.g., using multilateration) based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). in some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

To improve positioning performance, reference location devices (RLDs) have been introduced to assist in NR positioning procedures. RLDs have known locations and can perform positioning measurements (e.g., RSTD, RSRP, Rx-Tx time difference, etc.) and report these measurements to a location server. In addition, the RLD can transmit UL-PRS (e.g., SRS) to enable TRPs to measure and report uplink positioning measurements from devices at known location (e.g., RTOA, UL-AoA, gNB Rx-Tx time difference, etc.). The RLD's actual measurements can be compared with the measurements that would be expected at the RLD's known location to determine correction terms for nearby UEs. Similarly, the uplink measurements from the TRPs can be compared with the measurements that would be expected at the TRPs from the transmitted signal(s) of the RLD at the known location. The downlink and/or uplink location measurements for other UEs can then be corrected based on the previously determined correction terms. The correction terms may indicate calibration errors (e.g., group delay errors in transmit and receive chains of UEs and TRPs, time synchronization errors between TRPs, etc.). This principle is known from differential-global navigation satellite system (GNSS) operation.

Figure 4:
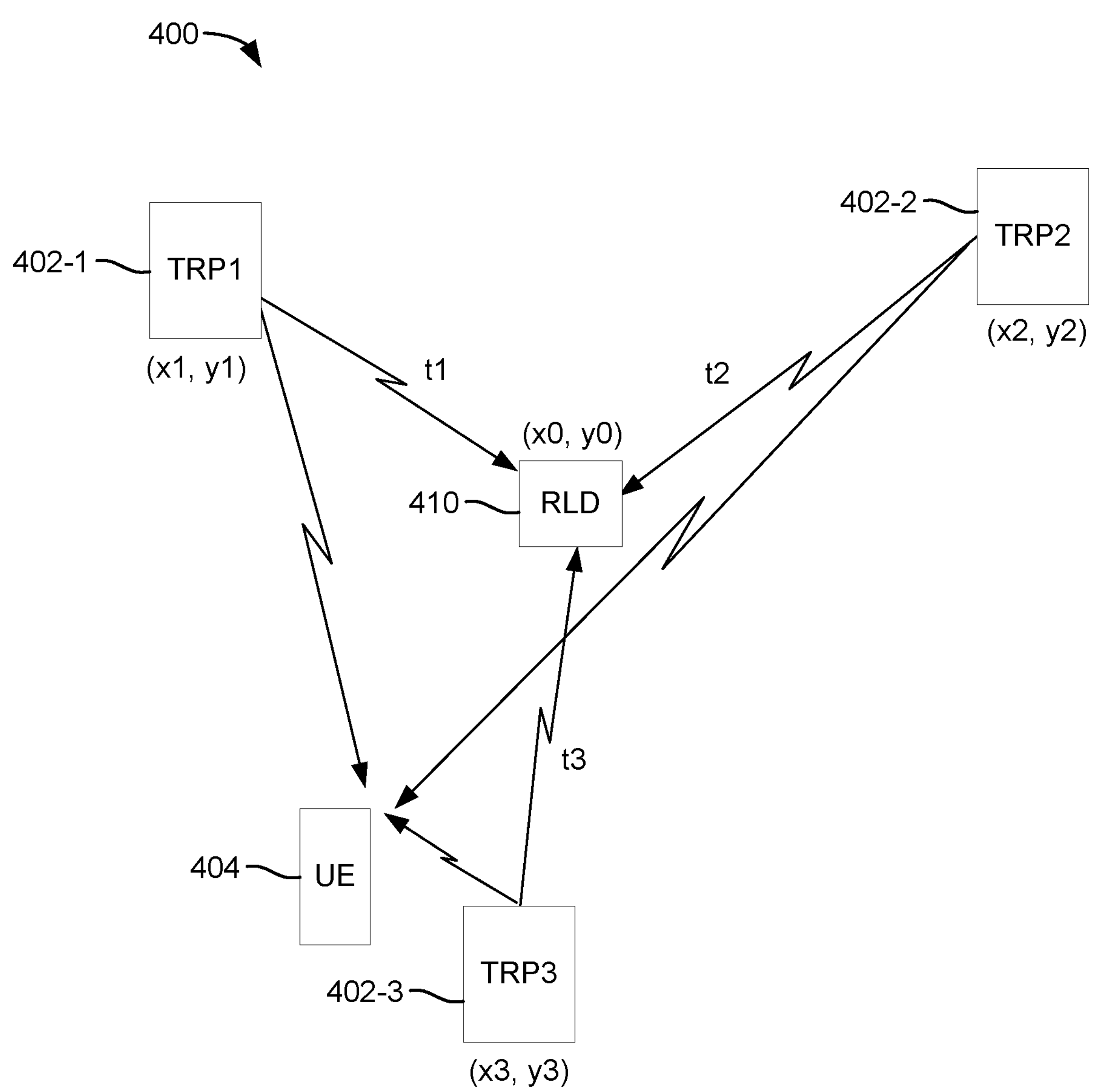
FIG. 4 is a diagram of an example wireless communications network in which a reference location device (RLD) is used to assist the positioning of a UE, according to aspects of the disclosure.

FIG. 4 is a diagram 400 of an example wireless communications network in which an RLD 410 (also referred to as a reference device) is used to assist the positioning of a UE 404, according to aspects of the disclosure. In the example of FIG. 4, a UE 404 (e.g., any of the UEs described herein) is engaged in a positioning session with three TRPs 402-1, 402-2, and 402-3 (collectively, TRPs 402), labeled "TRP1," "TRP2," and "TRP3," respectively. The TRPs 402 are transmitting downlink reference signals (e.g., DL-PRS) towards the UE 404 to enable the UE 404 to perform positioning measurements (e.g., RSTD measurements in the example of FIG. 4) of the reference signals.

The RLD 410 also receives and measures the downlink reference signals from TRPs 402 and reports the measurements (e.g., RSTDs) to a location server (not shown). Where the TRP 402-1 is the reference TRP, the RSTD for TRP 402-2 as measured by the RLD 410 can be represented as $RSTD_{meas}=t2-t1$. The location server knows the locations of the RLD 410 and the TRPs 402 and can therefore calculate the "true" (expected) RSTD at the RLD's 410 location as:

$$RSTD_{true}=(\sqrt{(x_2-x_0)^2+(y_2-y_0)^2}-\sqrt{(x_1-x_0)^2+(y_1-y_0)^2})/c$$

where c is the speed of light. $(x_0,y_0)$ (represented as (x0,y0) in FIG. 4) is the known location of the RLD 410, $(x_1,y_1)$ (represented as (x1,y1) in FIG. 4) is the known location of TRP 402-1, and $(x_2,y_2)$ (represented as (x2,y2) in FIG. 4) is the known location of TRP 402-2.

The location server can then determine an error term (e) as:

$$e = RSTD_{true} - RSTD_{meas}$$

When a normal UE 404 (at an unknown location) is measuring the RSTD between TRP 402-1 and TRP 402-2, the location server can use the previously determined error term to correct the UE's 404 measured RSTD as:

$$RSTD_{corrected,UE} = RSTD_{meas,UE} + e$$

The location server can then use the corrected RSTD to estimate the UE's 404 location. The same principle applies to uplink positioning methods, where the RLD transmits an uplink positioning signal (e.g., SRS) that is measured by the TRPs. The TRP uplink measurements can be compared with the "true" (expected) uplink measurement (e.g., an UL-AoA, an UL-RTOA, etc.) given the known locations of the RLD and TRPs. The difference between the "true" (expected) uplink measurement and the actual performed measurement would define an error term that can be used to correct a UE's uplink measurements.

To assist NR positioning techniques, an RLD with known location is expected to support the following functionalities:

Measure DL-PRS and report the associated measurements (e.g., RSTD, Rx-Tx time difference, RSRP, etc.) to the location server; and Transmit SRS and enable TRPs to measure and report measurements (e.g., RTOA, Rx-Tx time difference, AoA) associated with the reference device to the location server.

An RLD may also support the following functionalities:

Report the details of the signaling, the measurements, the parameters related to the reception and transmission timing delays, AoD and AoA enhancements, and measurement calibrations;

The report of device location coordinate information to the LMF if the LMF does not have the information;

The RLD with the known location being a UE and/or a gNB; and

The precision to which the location of the reference device is known.

An RLD performs positioning measurements just like a normal UE, but at an a-priori known location. Therefore, the RLD- and TRP-terminated positioning protocols can be the same protocols as used for normal UE positioning.

Figure 5:
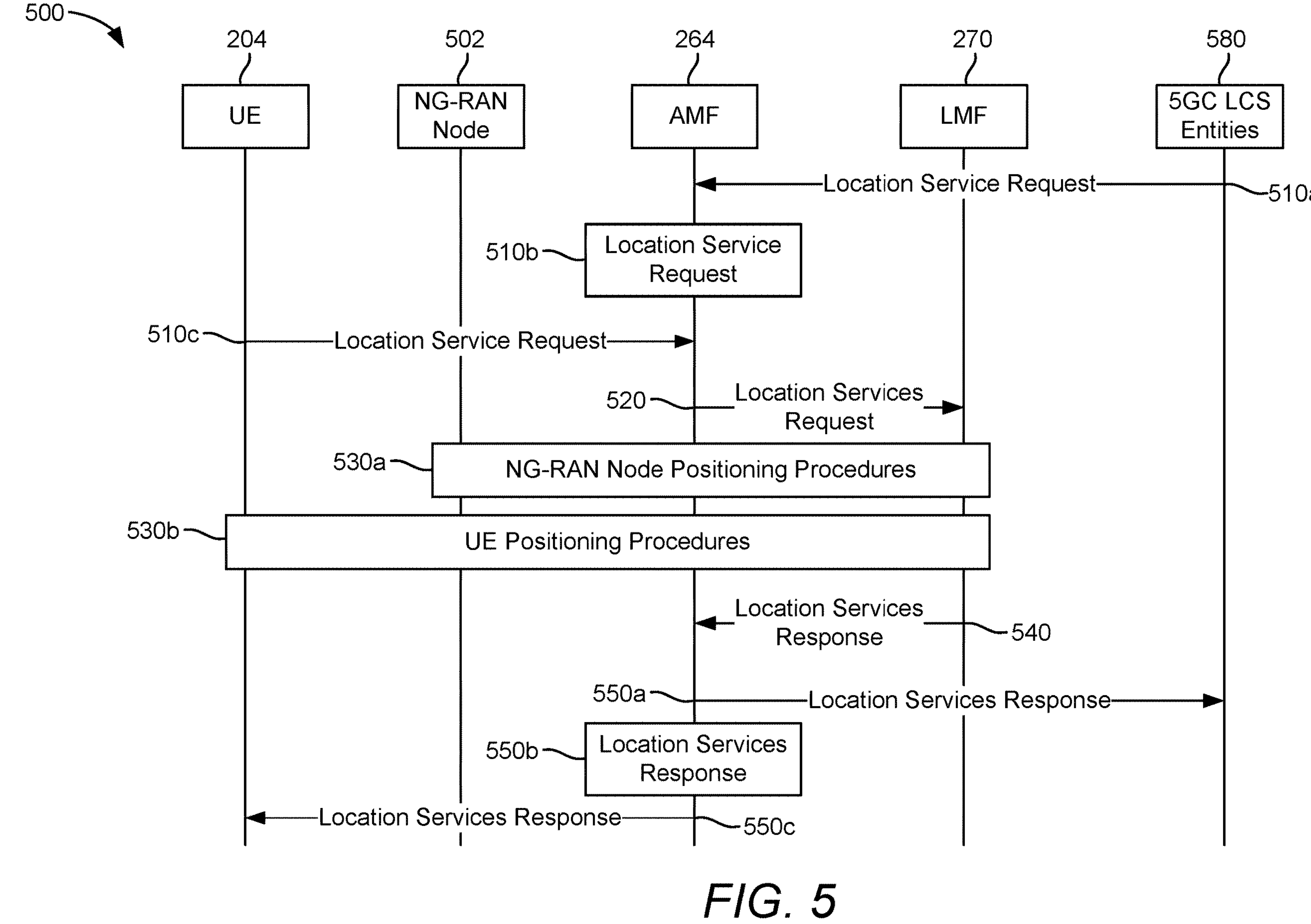
FIG. 5 illustrates an example positioning operation, according to aspects of the disclosure.

FIG. 5 illustrates an example UE positioning operation 500, according to aspects of the disclosure. The UE positioning operation 500 may be performed by a UE 204, an NG-RAN node 502 (e.g., gNB 222, gNB-CU 226, ng-eNB 224, or other node in the NG-RAN 220) in the NG-RAN 220, an AMF 264, an LMF 270, and a 5GC location services (LCS) entity 580 (e.g., any third-party application requesting the UE's 204 location, public service access point (PSAP), E-911 server, etc.).

A location services request to obtain the location of a target (i.e., UE 204) may be initiated by a 5GC LCS entity 580, the AMF 264 serving the UE 204, or the UE 204 itself. FIG. 5 illustrates these options as stages 510*a*, 510*b*, and 510*c*, respectively. Specifically, at stage 510*a*, a 5GC LCS entity 580 sends a location services request to the AMF 264. Alternatively, at stage 510*b*, the AMF 264 generates a location services request itself. Alternatively, at stage 510*c*, the UE 204 sends a location services request to the AMF 264.

Once the AMF 264 has received (or generated) a location services request, it forwards the location services request to the LMF 270 at stage 520. The LMF 270 then performs NG-RAN positioning procedures with the NG-RAN node 502 at stage 530*a* and UE positioning procedures with the UE 204 at stage 530*b*. The specific NG-RAN positioning procedures and UE positioning procedures may depend on the type(s) of positioning method(s) used to locate the UE 204, which may depend on the capabilities of the UE 204. The positioning method(s) may be downlink-based (e.g., LTE-OTDOA, DL-TDOA, and DL-AoD), uplink-based (e.g., UL-TDOA and UL-AoA), and/or downlink-and-uplink-based (e.g., LTE/NR E-CID and RTT), as described above. Corresponding positioning procedures are described in detail in 3GPP Technical Specification (TS) 38.305, which is publicly available and incorporated by reference herein in its entirety.

The NG-RAN positioning procedures and UE positioning procedures may utilize LTE positioning protocol (LPP) signaling between the UE 204 and the LMF 270 and LPP type A (LPPa) or NR positioning protocol type A (NRPPa) signaling between the NG-RAN node 502 and the LMF 270. LPP is used point-to-point between a location server (e.g., LMF 270) and a UE (e.g., UE 204) in order to obtain location-related measurements or a location estimate or to transfer assistance data. A single LPP session is used to support a single location request (e.g., for a single MT-LR, MO-LR, or network induced location request (NI-LR)). Multiple LPP sessions can be used between the same endpoints to support multiple different location requests. Each LPP session comprises one or more LPP transactions, with each LPP transaction performing a single operation (e.g., capability exchange, assistance data transfer, location information transfer). LPP transactions are referred to as LPP procedures.

A prerequisite for stage 530 is that an LCS Correlation identifier (ID) and the AMF ID has been passed to the LMF 270 by the serving AMF 264. Both, the LCS Correlation ID and the AMF ID may be represented as a string of characters selected by the AMF 264. The LCS Correlation ID and the AMF ID are provided by the AMF 264 to the LMF 270 in the location services request at stage 520. When the LMF 270 then instigates stage 530, the LMF 270 also includes the LCS Correlation ID for this location session, together with the AMF ID, which indicates the AMF instance serving the UE 204. The LCS Correlation identifier is used to ensure that during a positioning session between the LMF 270 and the UE 204, positioning response messages from the UE 204 are returned by the AMF 264 to the correct LMF 270 and carrying an indication (the LCS Correlation identifier) that can be recognized by the LMF 270.

Note that the LCS Correlation ID serves as a location session identifier that may be used to identify messages exchanged between the AMF 264 and the LMF 270 for a particular location session for a UE, as described in greater detail in 3GPP TS 23.273, which is publicly available and incorporated by reference herein in its entirety. As mentioned above and shown in stage 520, a location session between an AMF 264 and an LMF 270 for a particular UE is instigated by the AMF 264, and the LCS Correlation ID may be used to identify this location session (e.g., may be used by the AMF 264 to identify state information for this location session, etc.).

LPP positioning methods and associated signaling content are defined in the 3GPP LPP standard (3GPP TS 37.355, which is publicly available and incorporated by reference herein in its entirety). LPP signaling can be used to request and report measurements related to the following positioning methods: LTE-OTDOA, DL-TDOA, A-GNSS, E-CID, sensor, TBS, WLAN, Bluetooth, DL-AoD, UL-AoA, and multi-RTT. Currently, LPP measurement reports may contain the following measurements: (1) one or more ToA, TDOA, RSTD, or Rx-Tx measurements, (2) one or more AoA and/or AoD measurements (currently only for a base station to report UL-AoA and DL-AoD to the LMF 270), (3) one or more multipath measurements (per-path ToA, RSRP, AoA/AoD), (4) one or more motion states (e.g., walking, driving, etc.) and trajectories (currently only for the UE 204), and (5) one or more report quality indications.

As part of the NG-RAN node positioning procedures (stage 530*a*) and UE positioning procedures (stage 530*b*), the LMF 270 may provide LPP assistance data in the form of DL-PRS configuration information to the NG-RAN node 502 and the UE 204 for the selected positioning method(s). Alternatively or additionally, the NG-RAN node 502 may provide DL-PRS and/or UL-PRS configuration information to the UE 204 for the selected positioning method(s). Note that while FIG. 5 illustrates a single NG-RAN node 502, there may be multiple NG-RAN nodes 502 involved in the positioning session.

Once configured with the DL-PRS and UL-PRS configurations, the NG-RAN node 502 and the UE 204 transmit and receive/measure the respective PRS at the scheduled times. The NG-RAN node 502 and the UE 204 then send their respective measurements to the LMF 270.

Once the LMF 270 obtains the measurements from the UE 204 and/or the NG-RAN node 502 (depending on the type(s) of positioning method(s)), it calculates an estimate of the UE's 204 location using those measurements. Then, at stage 540, the LMF 270 sends a location services response, which includes the location estimate for the UE 204, to the AMF 264. The AMF 264 then forwards the location services response to the entity that generated the location services request at stage 510. Specifically, if the location services request was received from a 5GC LCS entity 580 at stage 510*a*, then at stage 550*a*, the AMF 264 sends a location services response to the 5GC LCS entity 580. If, however, the location services request was received from the UE 204 at stage 510*c*, then at stage 550*c*, the AMF 264 sends a location services response to the UE 204. Or, if the AMF 264 generated the location services request at stage 510*b*, then at stage 550*b*, the AMF 264 stores/uses the location services response itself.

Note that although the foregoing has described the UE positioning operation 500 as a UE-assisted positioning operation, it may instead be a UE-based positioning operation. A UE-assisted positioning operation is one where the LMF 270 estimates the location of the UE 204, whereas a UE-based positioning operation is one where the UE 204 estimates its own location.

Referring to RLDs in the context of FIG. 5, any RLD location measurements would be used by an LMF 270 to correct the measurements for target UEs 204. That is, the consumer of the RLD location information is an LMF 270, and therefore, stages 510 and 520 would not occur for RLDs. This essentially means that the LMF 270 becomes an "LCS Client" for RLDs and needs to be enabled to instigate location sessions with an RLD in absence of stages 510 and 520. Thus, for RLDs, an AMF 264/LMF 270 would not receive a location request from an LCS client; instead, the location client for RLD measurements would be the LMF 270 itself.

Figure 6:
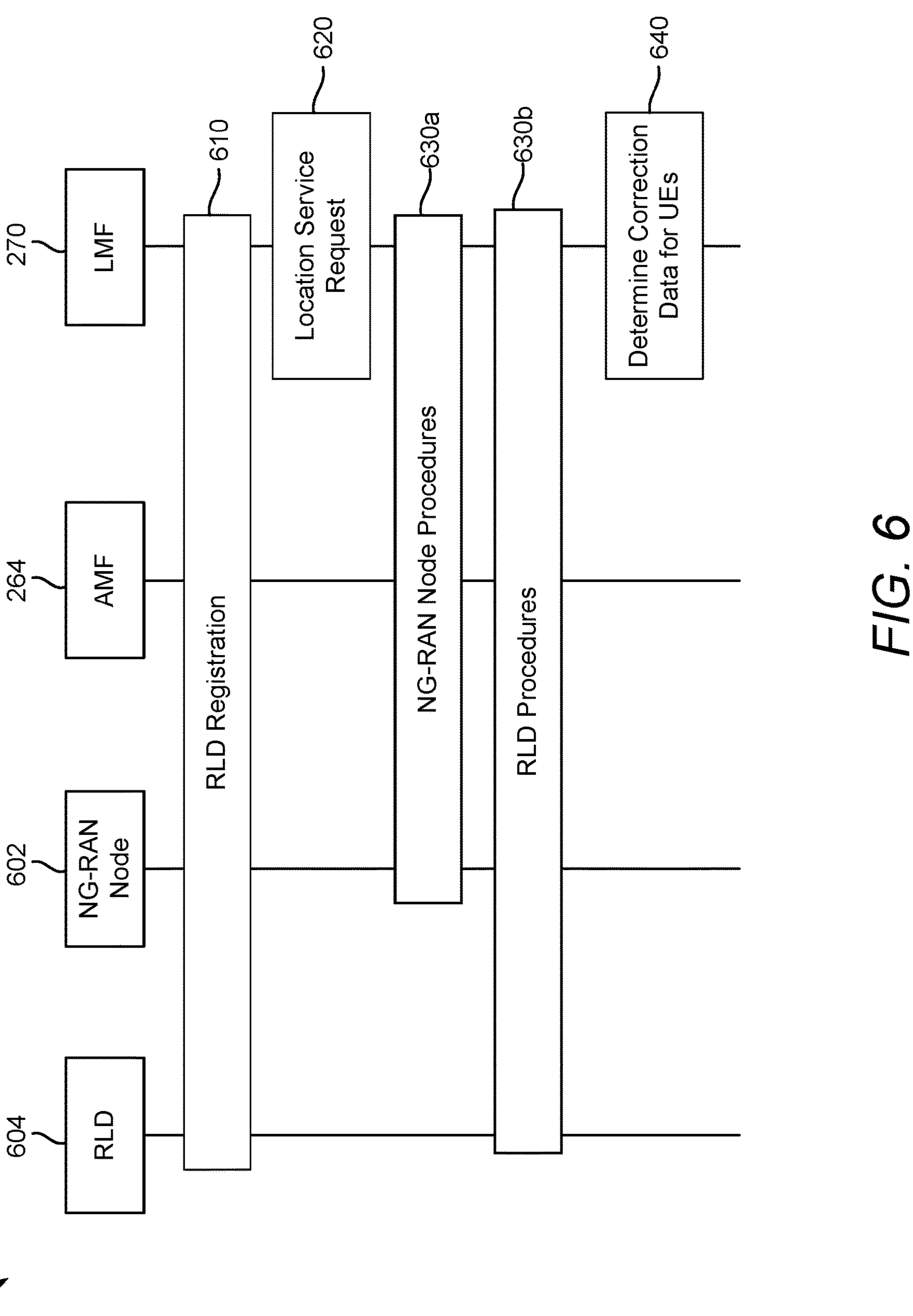
FIG. 6 illustrates an example RLD positioning operation, according to aspects of the disclosure.

As a consequence of the above, for an RLD positioning operation, stages 510 and 520 in FIG. 5 can be replaced by an "RLD Registration" procedure to make an LMF aware of RLDs in a network, such that the LMF is enabled to instigate an LPP or NRPPa session with the desired RLD or NG-RAN serving the RLD, respectively. FIG. 6 illustrates an example RLD positioning operation 600, according to aspects of the disclosure. The RLD positioning operation 600 may be performed by an RLD 604 (e.g., any of the RLDs described herein), an NG-RAN node 602 (e.g., gNB 222, ng-eNB 224), an AMF 264, and an LMF 270.

At stage 610, an RLD registration procedure is performed to make the LMF 270 aware of the RLDs 604 in the network. The registration procedure depends on whether the RLD 604 is considered to be a UE or a gNB, and different registration procedures are described below. At stage 620, the LMF 270 initiates a location services request internally to obtain the location of a target RLD 604 in order to determine correction data for UE positioning. The LMF 270 then performs NG-RAN procedures with the NG-RAN node 602 at stage 630*a* and RLD procedures with the RLD 604 at stage 630*b*. The RLD registration procedure at stage 610 enables the LMF 270 to instigate the positioning procedures at stage 630 in a similar way as currently specified for target UEs. At stage 640, the LMF 270 determines correction data for UE positioning, as described above with reference to FIG. 4.

Figure 7:
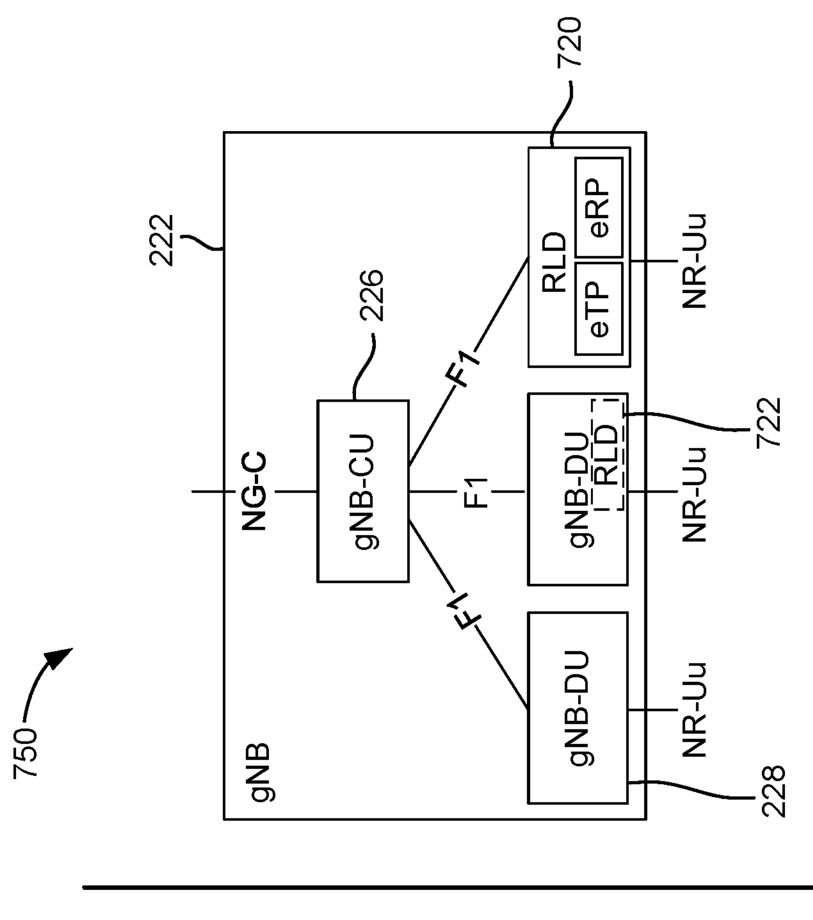
FIG. 7 illustrates the two principle architecture options for supporting RLDs in a network, according to aspects of the disclosure.
Figure 7:
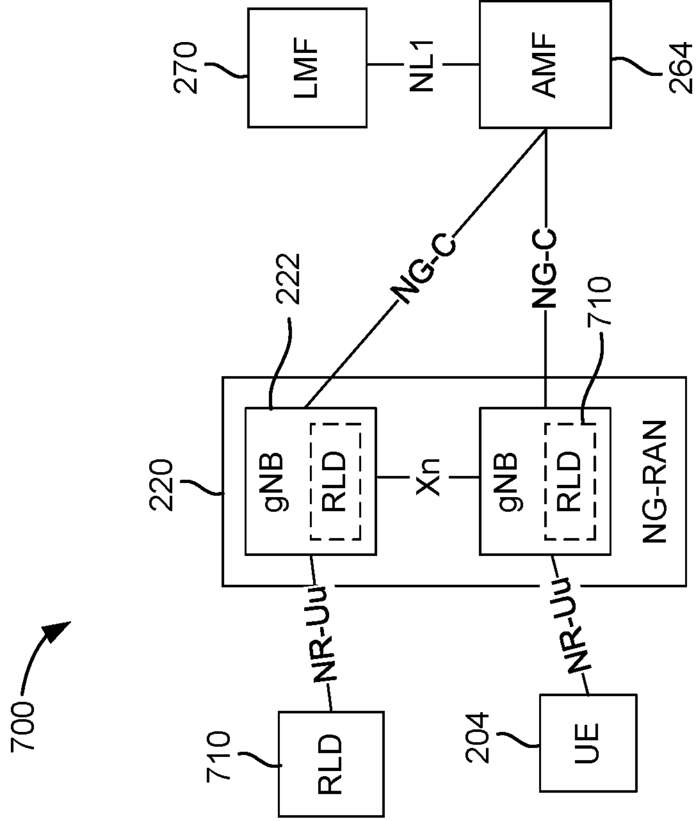

FIG. 7 illustrates the two principle architecture options for supporting RLDs in a network, according to aspects of the disclosure. As a first option, as shown by diagram 700, an RLD 710 (e.g., any of the RLDs described herein) is considered as a UE (e.g., as a UE 204) from the LMF's 270 perspective. Such an RLD may be any device that supports a control plane protocol stack and LPP positioning methods. This may include normal (mobile) UEs, dedicated UEs (which may typically be at fixed locations but may also be mobile), the mobile terminal (MT) of an integrated access and backhaul (IAB) node, the MT of a smart repeater, or the like. As an example, such an RLD may be a UE 302, as illustrated in FIG. 3A.

Figure 8:
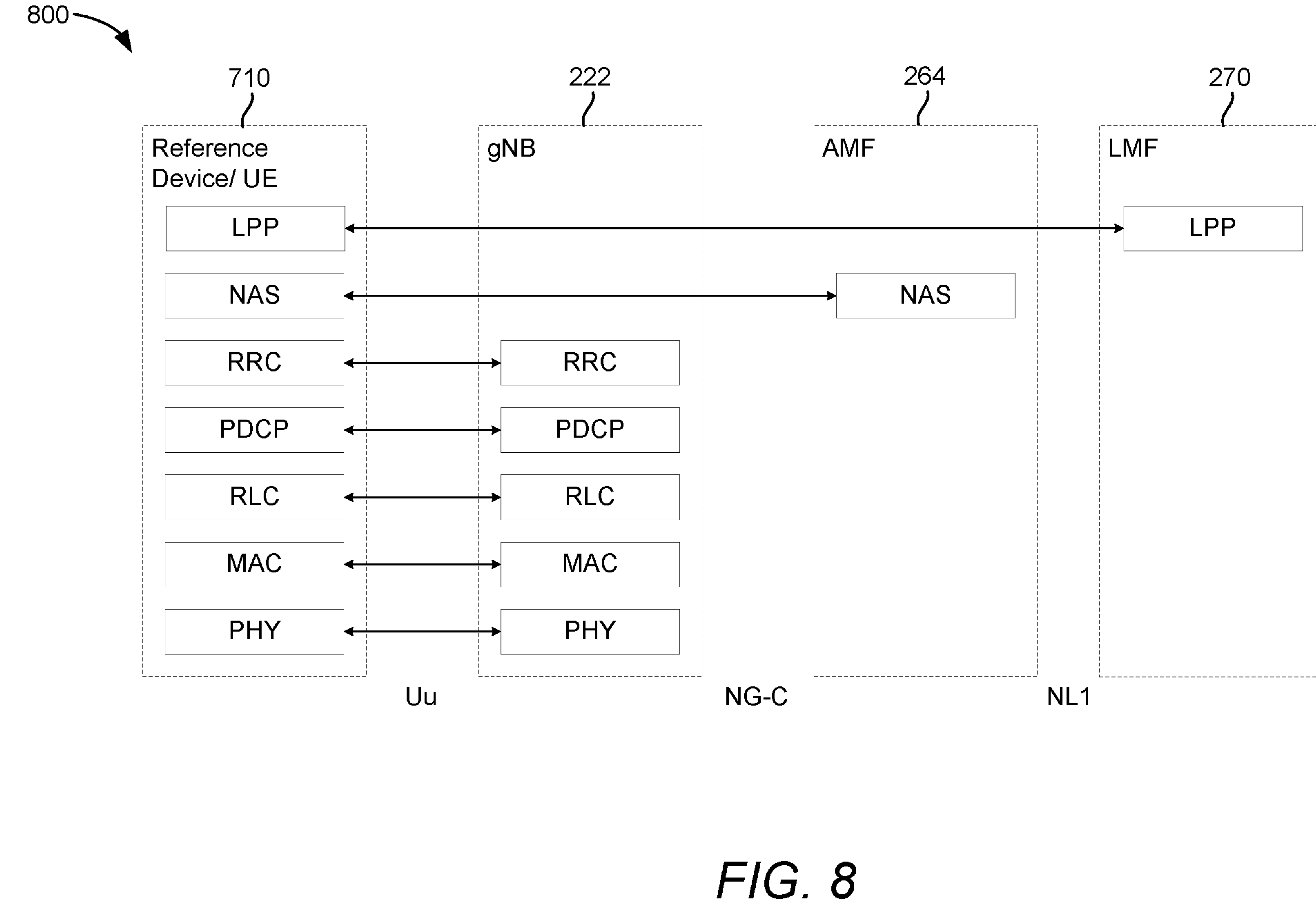
FIG. 8 is a diagram of a control plane protocol stack, according to aspects of the disclosure.

FIG. 8 is a diagram 800 of a control plane protocol stack 800, according to aspects of the disclosure. As illustrated by the double-arrow lines in FIG. 8, each layer of the protocol stack 800 implemented by the RLD 710 communicates with the same layer of the gNB 222, AMF 264, and LMF 270, and vice versa. Particular instances of a protocol layer are referred to as protocol "entities." As such, the terms "protocol layer" and "protocol entity" may be used interchangeably. Two corresponding protocol layers/entities are referred to as "peers," "peer entities," and the like. Collectively, the PDCP layer, the RLC layer, and the MAC layer are referred to as "Layer 2" or "L2." The PHY layer is referred to as "Layer 1" or "L1."

Figure 13:
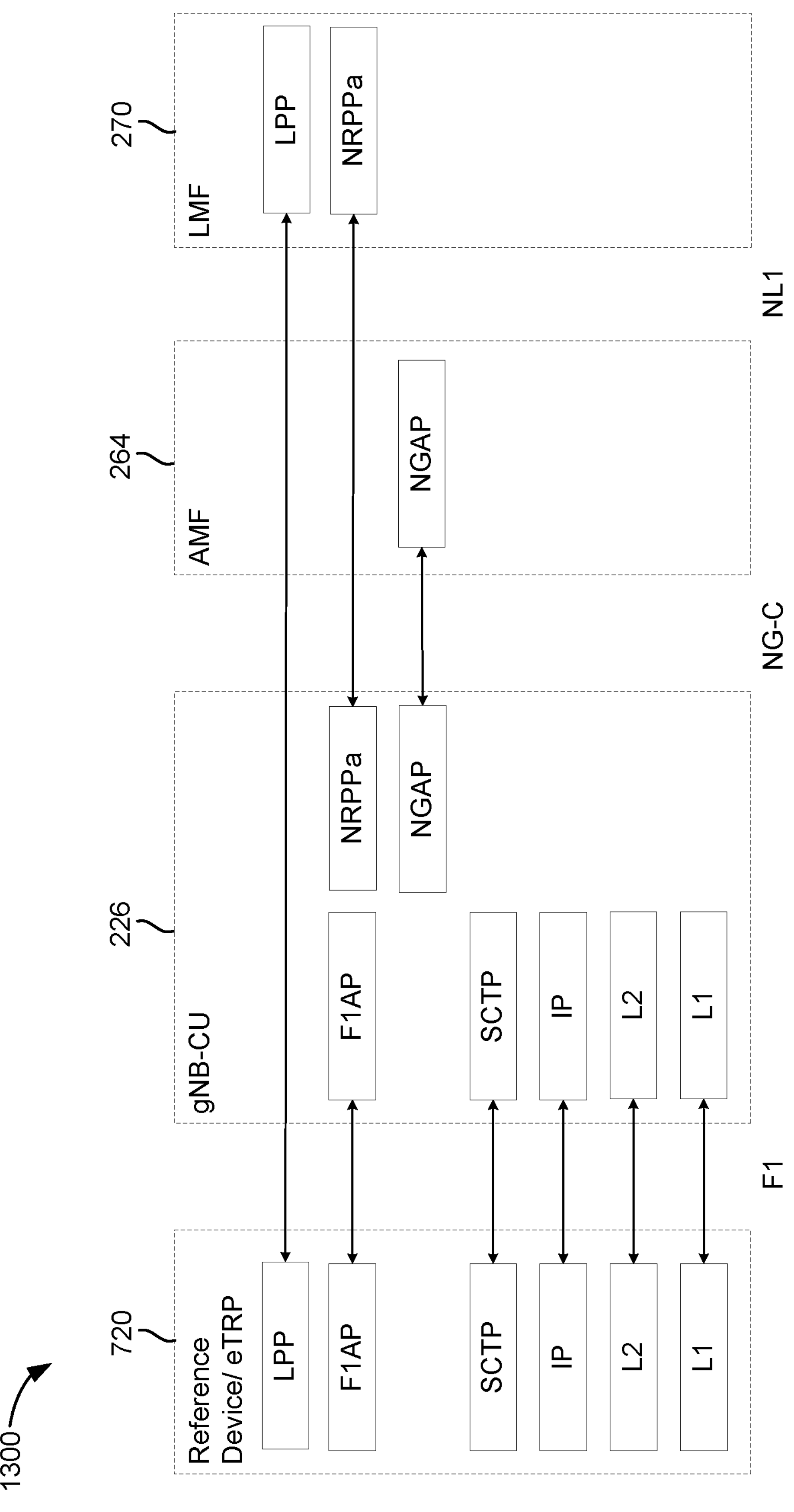
FIG. 13 is a diagram illustrating an example F1 protocol stack.

As a second option, as shown by diagram 750, an RLD is considered as part of a gNB 222 from the LMF's 270 perspective, either as a gNB-DU 228 (RLD 722) or an enhanced TRP (eTRP) (RLD 720). An eTRP is composed of an enhanced transmission point (eTP) and an enhanced reception point (eRP)). Such an RLD may be any device that has an F1 protocol stack (as illustrated in FIG. 13) and supports LPP positioning methods. As an example, such an RLD may be a base station 304, as illustrated in FIG. 3B. As discussed in greater detail below, in this option, LPP messages are encapsulated in NRPPa. The gNB-CU 226 (which terminates NRPPa) extracts the LPP PDU and forwards it to the eTRP 720 using the F1 interface. Both the first and second options are described in the following.

Figure 9:
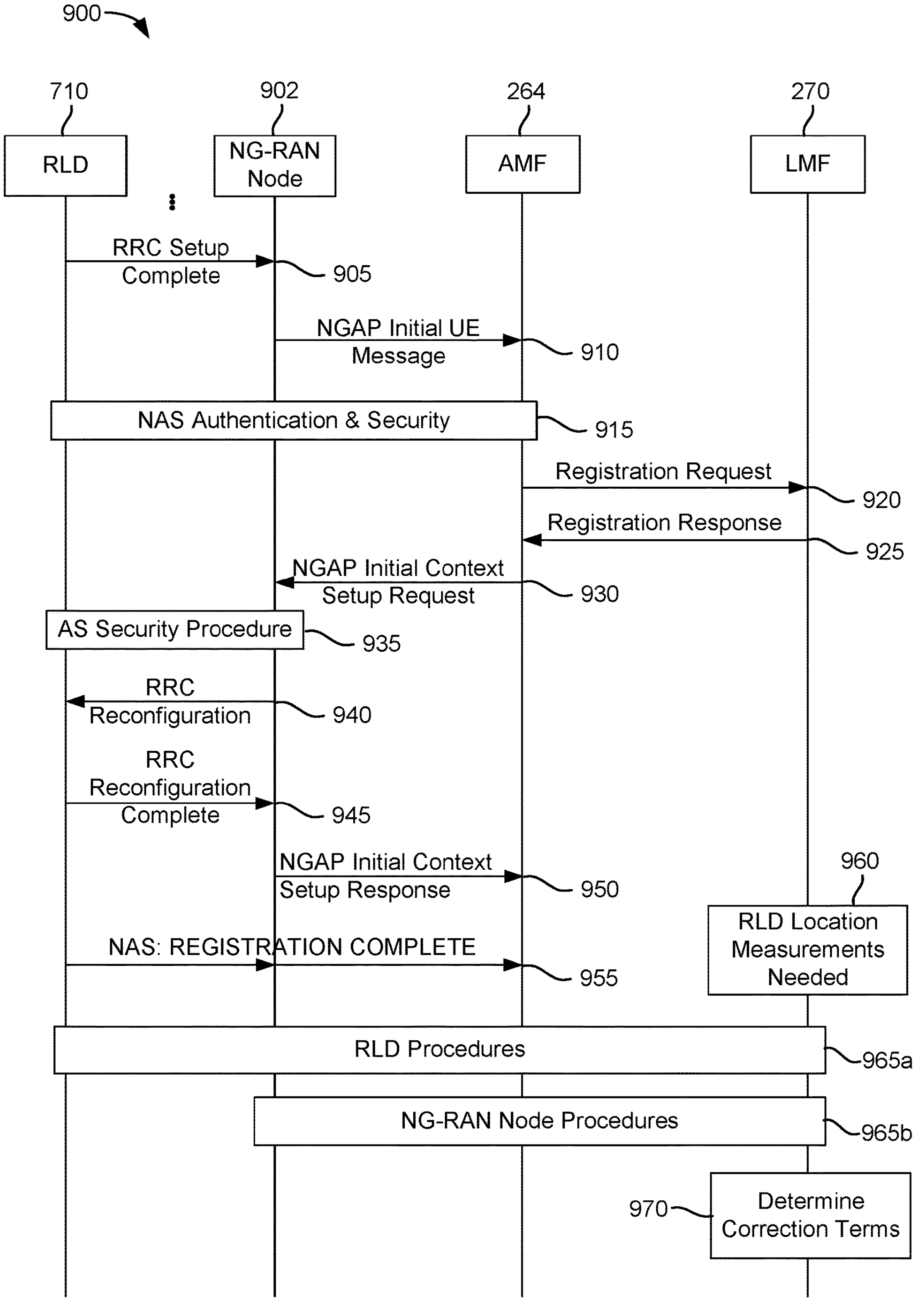
FIG. 9 illustrates an example RLD positioning operation using an RLD access registration, according to aspects of the disclosure.

If an RLD can be regarded as a "UE" from the LMF's perspective (as shown by diagram 700 in FIG. 7), two general RLD registration procedures are possible: (1) an RLD access registration procedure and (2) an RLD registration using supplementary services procedure. FIG. 9 illustrates an example RLD positioning operation 900 using an RLD access registration, according to aspects of the disclosure. In the example of FIG. 9, an RLD 710 may be a UE (e.g., a UE 204). In this solution, the RLD 710 registers to the gNB and the 5G core network (e.g., 5GC 260) like a normal UE (e.g., UE 204). As part of this registration procedure, the UE provides an indication to the serving AMF 264 whether the device can function as an RLD 710. The serving AMF 264 then registers the RLD 710 at an LMF 270 using a new Reference Device Registration Request service operation towards the LMF 270. The Reference Device Registration operation enables the LMF 270 to exchange LPP and NRPPa messages between the LMF 270 and the RLD 710 and NG-RAN 220, respectively, at a later time when the LMF 270 requires location measurements from a (registered) RLD 710.

Stages 905 to 955 are similar to the general procedure as used for UE registration with the gNB and the 5G core network with the addition of stages 920 and 925.

At stage 905, the RLD 710 and NG-RAN node 902 perform a 5G-NR RRC Connection Setup procedure (like a normal UE). At the end of this procedure, the RLD 710 sends the RRC Setup Complete message with a "Registration Request" in the dedicated NAS-Message field to the NG-RAN node 902. The NAS Registration Request includes the 5G mobility management (5GMM) capability information element (IE). This IE currently includes an indication whether the UE supports LPP and the 5G-LCS notification mechanisms. In an aspect, this IE also includes an indication of whether the UE can operate as an RLD 710. For example, an additional bit can be allocated to indicate whether the UE can operate as an RLD 710.

At stage 910, the gNB selects the AMF 264 and allocates a "RAN UE NGAP ID." The AMF 264 will use this ID to address the RLD context on the gNB. The gNB then sends the NGAP (NG application protocol) Initial UE Message to the selected AMF 264. The message carries the "Registration Request" message that was received from the RLD 710 in the RRC Setup Compete message in stage 905. The "RAN UE NGAP ID" and the "RRC Establishment Cause" are also included in the message.

At stage 915, the RLD 710 and 5GC perform the NAS Authentication and Security procedures.

At stage 920, if the 5GMM Capability IE received at stage 910 indicates support for "RLD Functionality," the AMF 264 invokes a "Reference Device Registration Request" service operation (e.g., an "Nlmf_Location_ReferenceDeviceRegistrationRequest" message) towards the selected LMF 270 to register the RLD 710 at the LMF 270. The service operation includes an LCS Correlation identifier (assigned by the AMF 264) and the AMF identity, together with the serving cell identity, and may also include the subscription permanent identifier (SUPI) and permanent equipment identifier (PEI) of the RLD 710. The LMF 270 maintains a database of RLDs 710. Each RLD 710 is associated with an LCS Correlation ID and the AMF ID of the AMF instance serving the RLD 710.

At stage 925, if the LMF 270 can handle the RLD Registration Request, the LMF 270 returns an acknowledgement to the AMF 264 in a Reference Device Registration Response service operation (e.g., an "Nlmf_Location_ReferenceDeviceRegistrationResponse" message) towards the AMF 264 that includes the LCS Correlation identifier received at stage 920. The LMF 270 stores the LCS Correlation identifier and the AMF ID for later use in stage 965.

The Nlmf_ReferenceDevice service enables an LMF 270 to obtain RLD information and associated parameters. The service operations defined for the Nlmf_ReferenceDevice service are as follows: (1) ReferenceDeviceRegistration request and response, which provides Reference Device Information for an RLD 710 from an AMF 264 to an LMF 270, (2) ReferenceDeviceRegistrationUpdate, which provides updated Reference Device Information from an AMF 264 to an LMF 270 for a previously registered RLD 710, and (3) ReferenceDeviceDeregistration, which enables an AMF 264 to deregister a previously registered RLD 710 at an LMF 270. A deregistration may also be considered as a special case for a ReferenceDeviceRegistrationUpdate.

At stage 930, the AMF 264, NG-RAN 220, and RLD 710 continue the general registration procedure as for normal UEs. The AMF 264 may initiate a session setup with the gNB. The message typically contains the Registration Accept NAS message. The NAS Registration Accept may include an indication that the RLD registration at an LMF 270 was successful. The message may be an NGAP Initial Context Setup Request.

At stage 935, the RLD 710 and the gNB perform the AS Security Procedures.

At stage 940, the RRC Reconfiguration message is typically sent to the RLD 710 for setting up radio bearers, etc. The message includes the 5GS Registration Result received in the Registration Accept message at stage 930. The 5GS Registration Result informs the UE whether the registration at an LMF 270 was successful or not. This stage may not be needed, but would inform the RLD 710 that registration at the LMF 270 was successful, and that the RLD 710 may now expect Location Requests for calibration purposes.

Stages 945 to 955 are the same as to complete a normal registration procedure.

At stage 960, at some later time, the LMF 270 determines that location measurements from an RLD 710 previously registered at the LMF 270 are needed and may instigate an LPP and/or NRPPa session with the RLD 710 or the NG-RAN 220 serving the RLD 710 at stages 965*a* and 965*b* (collectively stage 965), respectively.

The procedures at stages 965*a* and 965*b* can now be executed in a similar manner as currently defined for normal UEs.

Figure 10:
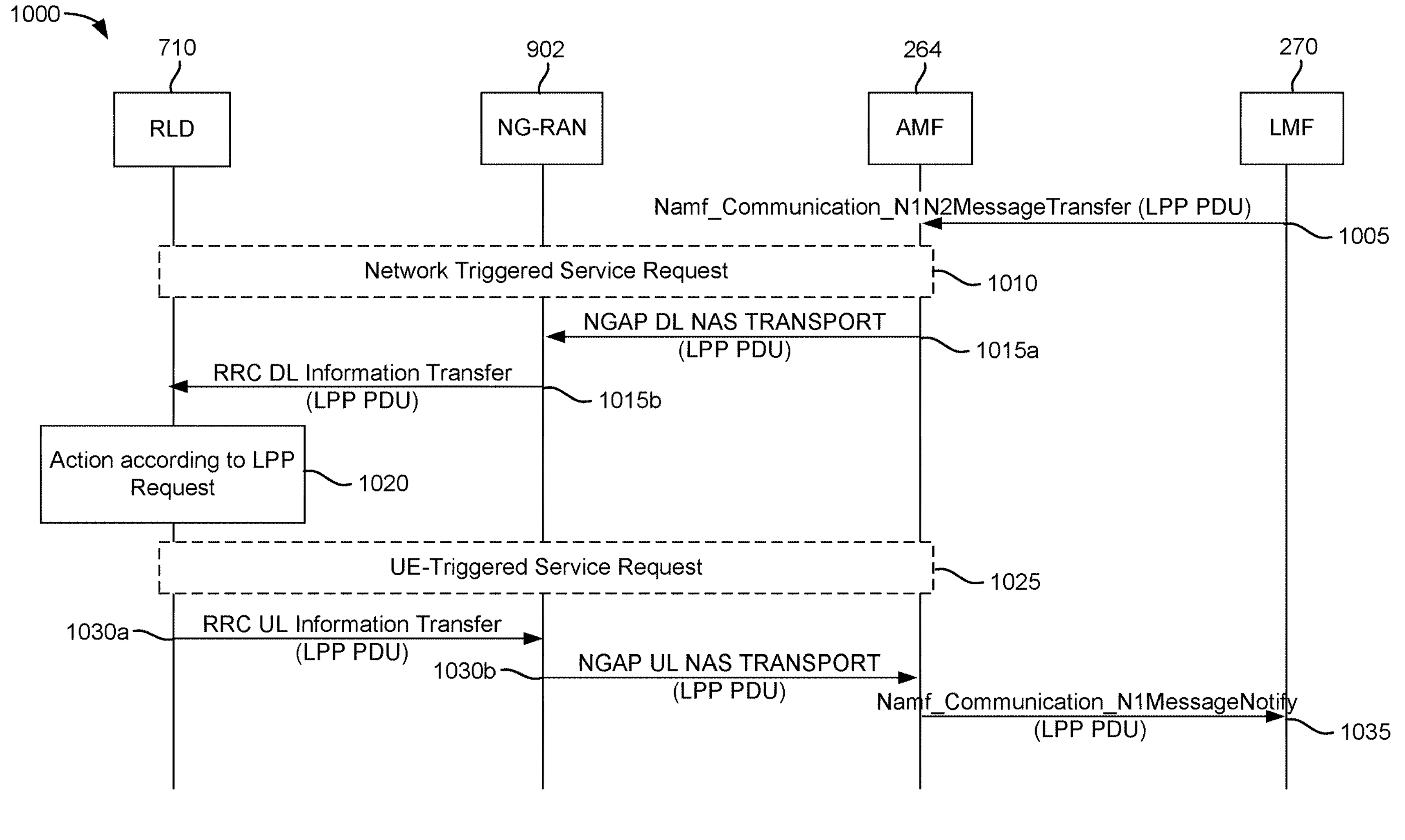
FIG. 10 illustrates an example Long-Term Evolution (LTE) positioning protocol (LPP) protocol data unit (PDU) transfer between a location server and an RLD, according to aspects of the disclosure.

At Stage 965*a* in FIG. 9 the LMF 270 may instigate an LPP session with RLD 710 that comprises the transfer of one or more LPP PDUs to RLD 710 and the reception of one or more LPP PDUs from the RLD 710. The LPP PDUs may include LPP Request/Provide Capabilities, LPP Request/Provide Assistance Data, or LPP Request/Provide Location Information messages. A procedure for the LPP PDU transfer is illustrated in FIG. 10.

At stage 1005, the LMF 270 invokes a Namf_Communication_N1N2MessageTransfer service operation towards the AMF 264 that previously registered the RLD 710 at the LMF 270 for this RLD 710. This service operation includes the one or more LPP PDUs that should be transferred to the RLD 710. This service operation includes the LCS Correlation ID and the AMF ID provided to the LMF 270 previously at stage 920 in FIG. 9 and stored at the LMF 270. The AMF instance belonging to the AMF ID/LCS Correlation ID is used to forward the LPP messages to the RLD 710.

At stage 1010, if the RLD 710 is in CM IDLE state, the AMF 264 initiates a network triggered Service Request procedure as defined in 3GPP TS 23.502 (which is publicly available and incorporated by reference herein in its entirety) to establish a signaling connection with the RLD 710.

At stages 1015*a* and 1015*b*, the AMF 264 includes the LPP PDU(s) in the payload container of a NAS Transport message, and a Routing Identifier, which is set to the LCS Correlation ID, identifying the LMF 270 in the Additional Information of the NAS Transport message defined in 3GPP TS 24.501 (which is publicly available and incorporated by reference herein in its entirety). The AMF 264 then sends the DL NAS Transport message to the serving NG-RAN Node 902 in an NGAP Downlink NAS Transport message defined in 3GPP TS 38.413 (which is publicly available and incorporated by reference herein in its entirety). The NG-RAN Node 902 then forwards the DL NAS Transport message to the RLD 710 in an RRC DL Information Transfer message.

At stage 1020, if the LPP PDU is of type "Request Location Information," the RLD 710 performs the requested reference measurements (e.g., RSTD, RSRP, UE Rx-Tx time difference measurements).

At stage 1025, if the RLD 710 has entered CM IDLE state during stage 1020, the RLD 710 instigates the UE triggered Service Request as defined in 3GPP TS 23.502 in order to establish a signaling connection with the AMF 264.

At stages 1030*a* and 1030*b*, the RLD 710 includes the LPP PDU with the obtained reference measurements (if requested at stage 1015) from stage 1020 in the payload container of an UL NAS Transport message, and the Routing Identifier, which has been received in stage 1015, in the Additional Information of the UL NAS Transport message defined in 3GPP TS 24.501. The RLD 710 then sends the UL NAS Transport message to the serving NG-RAN node 902 in an RRC UL Information Transfer message. The NG-RAN node 902 forwards the UL NAS Transport Message to the AMF 264 in an NGAP Uplink NAS Transport message.

At stage 1035, the AMF 264 invokes the Namf_Communication_N1MessageNotify service operation towards the LMF 270 indicated by the routing identifier received at stage 1030. The service operation includes the LPP message(s) received at stage 1030 and the LCS Correlation identifier in the N1 Message Container as defined in 3GPP TS 29.518 (which is publicly available and incorporated by reference herein in its entirety).

Figure 11:
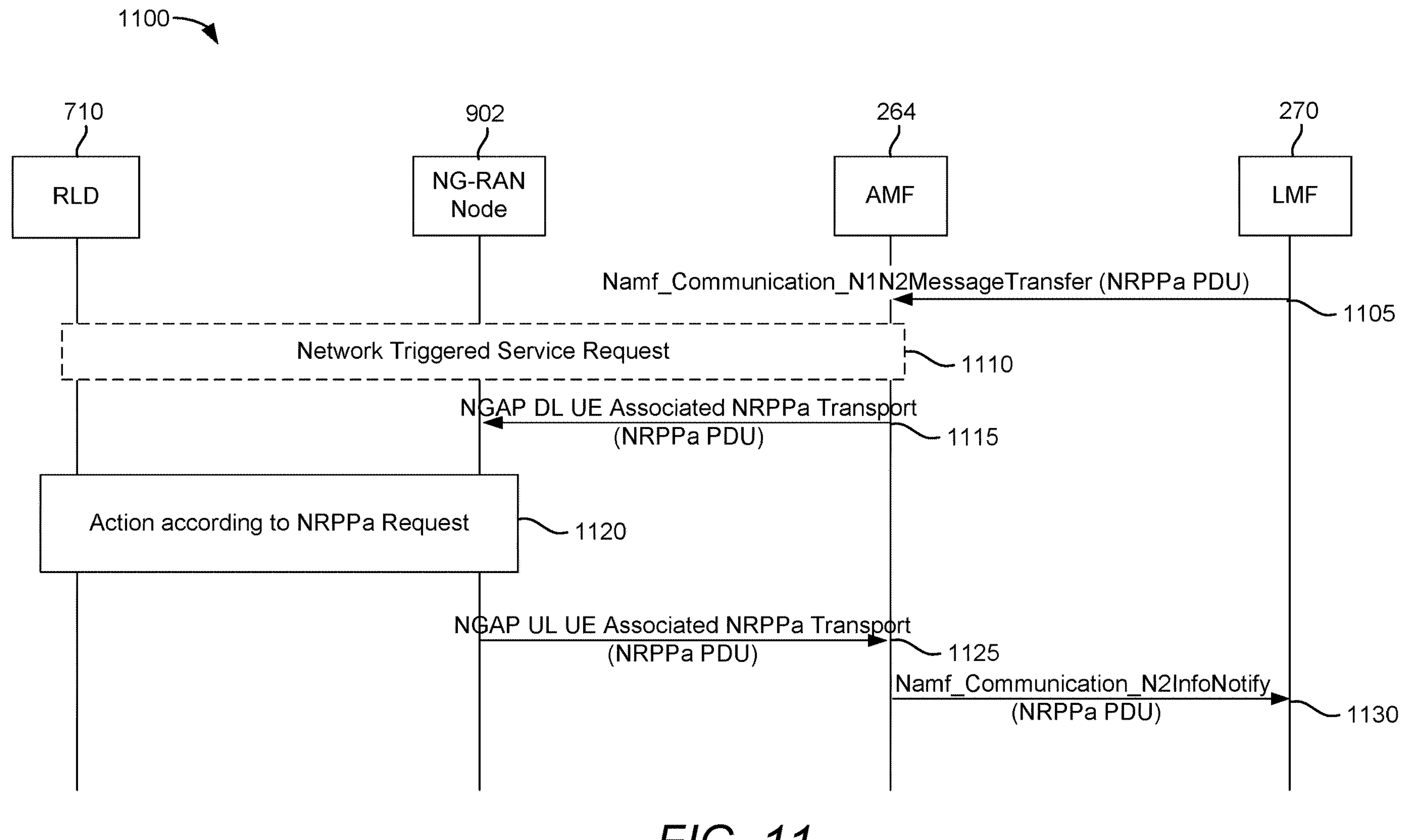
FIG. 11 illustrates an example RLD-associated New Radio positioning protocol type A (NRPPa) PDU transfer between an LMF and an radio access network (RAN) node, according to aspects of the disclosure.

Referring back to FIG. 9, at Stage 965*b*, the LMF 270 may instigate an NRPPa session with the serving NG-RAN node 902 of the RLD 710 that comprises the transfer of one or more NRPPa PDUs to the NG-RAN node 902 and reception of one or more NRPPa PDUs from the NG-RAN node 902. The NRPPa PDUs may include messages related to E-CID Location Information Transfer, OTDOA Information Transfer, Assistance Information Transfer, Positioning Information Transfer, TRP Information Transfer, Measurement Information Transfer, as defined in 3GPP TS 38.455 (which is publicly available and incorporated by reference herein in its entirety). A procedure 1100 for the NRPPa PDU transfer is illustrated in FIG. 11.

At stage 1105, the LMF 270 invokes a Namf_Communication_N1N2MessageTransfer service operation towards the AMF 264 that previously registered the RLD 710 at the LMF 270 for this RLD 710. This service operation includes the one or more NRPPa PDUs that should be transferred to the NG-RAN node 902. This service operation includes the LCS Correlation ID and the AMF ID provided to the LMF 270 previously at stage 920 in FIG. 9 and stored at the LMF 270.

At stage 1110, if the RLD 710 is in CM IDLE state, the AMF 264 initiates a network triggered Service Request procedure, as defined in 3GPP TS 23.502, to establish a signaling connection with the RLD 710.

At stage 1115, the AMF 264 forwards the NRPPa message to the serving NG-RAN node 902 in an NGAP DL UE Associated NRPPa Transport message over the NG signaling connection corresponding to the RLD 710, and includes the Routing ID identifying the LMF 270 (e.g., a global address of the LMF 270).

At stage 1120, the serving NG-RAN node 902 performs the action for the RLD 710 as requested by the NRPPa message at stage 1115. This may include determining an SRS configuration for the RLD 710 and providing the SRS configuration to the RLD 710, or activating a previously configured SRS in the RLD 710.

At stage 1125, the serving NG-RAN node 902 returns an NRPPa response message to the AMF 264 in an NGAP UL UE Associated NRPPa Transport message and includes the Routing ID received at stage 1115.

At stage 1130, the AMF 264 invokes the Namf_Communication_N2InfoNotify service towards the LMF 270 indicated by the Routing ID received at stage 1125. The service operation includes the NRPPa message received at stage 1125 and the LCS Correlation ID from stage 1105 in the N2 Info Container as defined in 3GPP TS 29.518.

Returning to FIG. 9, at stage 970, the LMF 970 determines correction terms from the received RLD or NG-RAN node measurements at stage 965 using the known location of the RLD 710, as discussed above with reference to FIG. 4. The LMF 270 stores the correction terms and uses them to correct location measurements for other UEs. The LMF 270 repeats stages 965 to 970 whenever new or updated RLD measurements are needed.

For this solution, a new service operation is needed to allow an AMF 264 to register an RLD 710 at the LMF 270, as shown by stages 920 and 925 in FIG. 9. This operation may be part of the Nlmf_Location service operation, or may be a new service operation (e.g., a Nlmf_ReferenceDevice service operation). In addition to the RLD Registration, an RLD Deregistration and RLP Registration Update service operation may also be needed. For example:

- Reference Device Registration: Provides RLD information to an LMF, including LCS Correlation ID, AMF ID, enhanced CGI (ECGI), NR CGI (NCGI), RLD SUPI, and RLD PEI;
- Reference Device Registration Update: Provides updated Reference Device Information to an LMF for a previously registered Reference Device (e.g., a new ECGI or NCGI in case the serving NG-RAN node changes, or RLD location changes, etc.);
- Reference Device Deregistration: Enables an AMF to deregister a previously registered Reference Device at an LMF (e.g., in case the serving AMF for an RLD changes, or RLD is switched-off, etc.).

As described above, the location procedures between an LMF and an RLD can be performed in a similar manner as for normal UEs. NRPPa can be used as currently specified for uplink-based (e.g., UL-AoA, UL-TDOA) and downlink-and-uplink-based (e.g., multi-RTT) positioning methods and no changes to the NRPPa protocol appear to be needed. Also, LPP can be used as currently defined; however, some RLD-specific additions may be needed.

For example, referring to the LPP capability transfer, the positioning method capabilities (e.g., for UL-TDOA, UL-AoA, DL-TDOA, DL-AoD, or multi-RTT) would equally apply to RLDs. They provide positioning-specific capabilities supported by the RLD to the LMF (e.g., supported measurements, etc.). The LPP Provide Capabilities message may include additional parameters/attributes, such as the location (latitude/longitude/altitude together with uncertainty shape) of the RLD, the location source (e.g., GNSS, A-GNSS, DL-TDOA, DL-AoD, surveyed), velocity, whether the RLD is static/fixed or mobile, whether the RLD is battery powered or mains-operated (i.e., plugged in), etc.

For an LPP assistance data transfer, no RLD-specific additions appears to be needed for the assistance data delivery. The normal (UE-assisted) positioning method-specific assistance data would equally apply to RLDs.

For an LPP location information transfer, the positioning method-specific request/provide messages are equally applicable to RLDs for requesting and providing the UE positioning measurements (e.g., "NR-Multi-RTT-ProvideLocationInformation," "NR-DL-AoD-ProvideLocationInformation," "NR-DL-TDOA-ProvideLocationInformation"). However, some additions to the "CommonIEsRequestLocationInformation" may be needed. The "CommonIEsRequestLocationInformation" carries common IEs for a Request Location Information LPP message type includes a (mandatory present) "LocationInformationType," which indicates whether the server requires a location estimate or measurements, whether location measurements are preferred but location estimate is also allowed, or whether location estimate is preferred but location measurements are also allowed.

A location estimate should not be applicable to RLDs, since the (precise) location of the reference device needs to be known and only location measurements should be reported. The Reference Device Location and Reference Device Measurements should be independent; that is, Reference Device Measurements are not used for determining the Reference Device Location. An additional entry in the "LocationInformationType" could avoid mixing "location measurements" and "location estimates" as used for normal UE positioning and would only be applicable to RLDs. This IE may have the name "referenceMeasurementsRequired."

Figure 12:
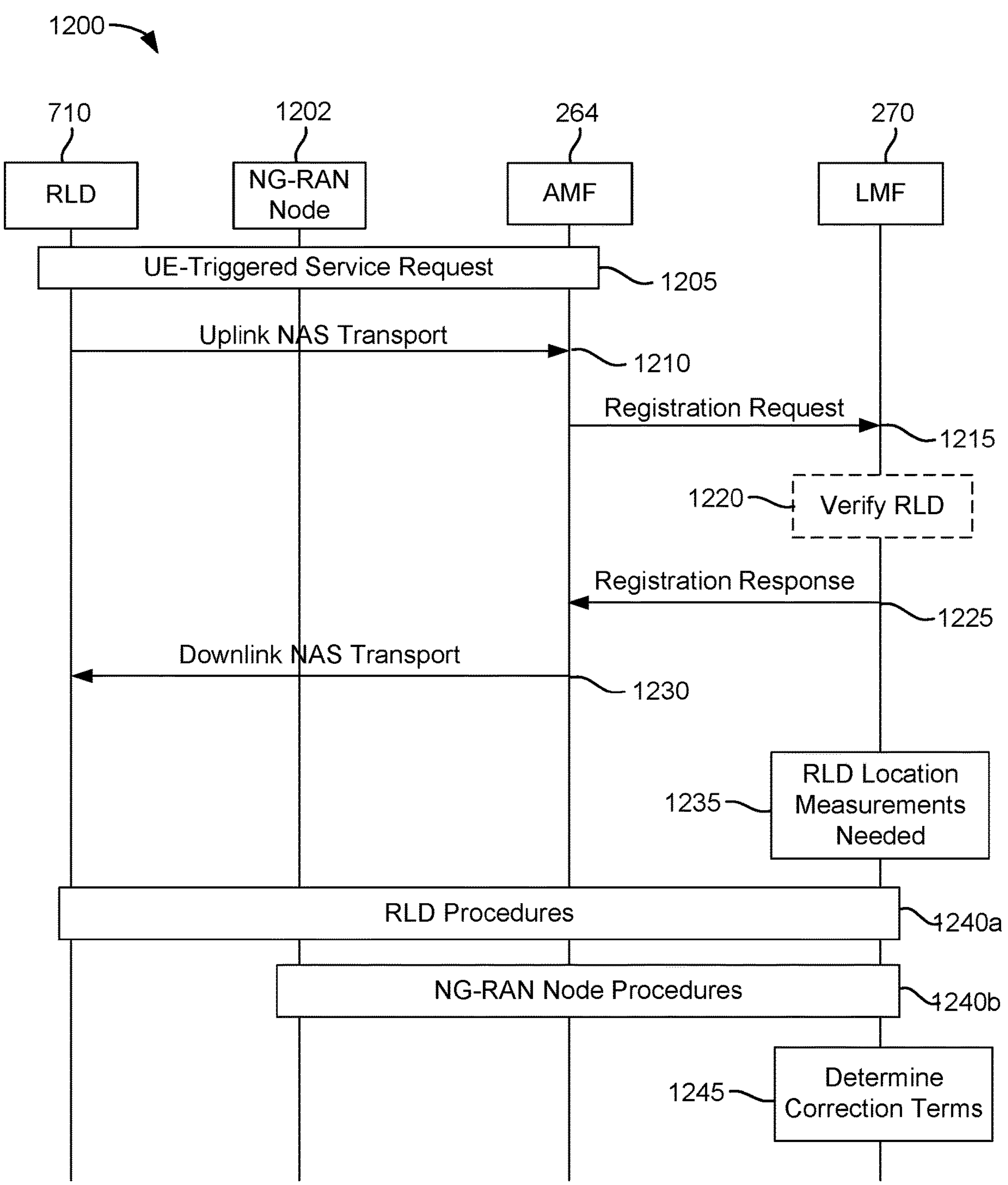
FIG. 12 illustrates an example RLD positioning operation with RLD registration using supplementary services, according to aspects of the disclosure.

FIG. 12 illustrates an example RLD positioning operation 1200 with RLD registration using supplementary services, according to aspects of the disclosure. In this solution, the RLD 710 registers with an LMF 270 using a new Supplementary Services message pair. The LMF 270 and RLD 710 can then exchange LPP messages via the serving AMF 264. This solution avoids any impacts to an AMF 264 and gNB (e.g., gNB 222), and can also avoid any impacts to LPP.

At stage 1205, the RLD 710 performs a UE-triggered service request via the NG-RAN node 1202 in order to establish a signaling connection with the AMF 264.

At stage 1210, the RLD 710 sends a Supplementary Services (SS) LCS Reference Location Device Registration Request message inside an uplink NAS Transport message to the serving AMF 264. The RLD 710 sets the Payload Container Type to "Location Services Message Container" and includes a Routing Identifier in the "Additional Information" IE. The Routing Identifier in the uplink NAS Transport message may be preconfigured in the RLD 710 to indicate a specific LMF 270. The LCS Reference Location Device Registration Request message includes the location of the RLD 710 (latitude, longitude, altitude, together with uncertainty shape), and other RLD capabilities, such as whether the device is fixed or mobile, battery powered or mains-operated, etc. Alternatively, this information may also be provided in an LPP PDU embedded in the LCS Reference Location Device Registration Request message. However, providing this information as part of the SS LCS Reference Location Device Registration Request message and specified in SS means that no LPP changes may be needed. The RLD 710 and LMF 270 can assume that all LPP messages exchanged during stage 1240 relate to the reference location of the RLD 710.

At stage 1215, the AMF 264 determines the LMF 270 from the Routing Identifier received in the Additional Information IE of the uplink NAS Transport message in stage 1210 and forwards the LCS Reference Location Device Registration Request message to the LMF 270 via triggering Namf_Communication_N1MessageNotify service operation towards the LMF 270. The AMF 264 also includes the Payload Container Type and the LCS Correlation identifier set to the Routing Identifier received at stage 1210. The AMF 264 includes the RLD's 710 SUPI or PEI of the RLD in the N1MessageNotification. The LMF 270 stores the serving AMF ID included in the N1 Message Container for later use in stage 1240. The LMF 270 also maintains a database of RLDs 710. Each RLD 710 is associated with an LCS Correlation ID and the AMF ID of the AMF instance serving the RLD 710.

At stage 1220, the LMF 270 may verify whether the RLD 710 is allowed to act as a reference device in the network from the SUPI or PEI. The SUPI or PEI of allowed RLDs 710 in an LMF 270 may be preconfigured.

At stage 1225, the LMF 270 returns a supplementary services acknowledgement message to the RLD 710 via triggering an Namf_Communication_N1N2MessageTransfer service operation to the serving AMF 264. The acknowledgement indicates to the RLD 710 that it has been successfully registered at the LMF 270. The LMF 270 also assigns and includes an LCS Correlation identifier identifying the LMF 270.

At stage 1230, upon receipt of the acknowledgement message from the LMF 270, the AMF 264 sets the Payload Container Type in the downlink NAS Transport to "Location Services Message Container" and includes an LCS Correlation ID in the "Additional Information" IE.

At stage 1235, at some later time, the LMF 270 determines that location measurements from an RLD 710 previously registered at the LMF 270 are needed and may instigate an LPP and/or NRPPa session with the RLD 710 or the NG-RAN serving the RLD 710 at stages **1240*a* and 1240*b* (collectively stage 1240**), respectively.

The procedure at stages **1240*a* and 1240*b* can now be executed as stages 965*a* and 965*b* in the solution illustrated in FIG. 9 with the following modifications. First, the LCS Correlation identifier indicating the LMF 270 and positioning session for use at stage 1005 in FIG. 10 is assigned by the LMF 270. The LCS Correlation identifier is used in stages 1005, 1015, 1030, and 1035 in the procedure 1000 in FIG. 10 to ensure that during the positioning session between the LMF 270 and the RLD 710, positioning response messages from the RLD 710 are returned by the AMF 264 to the correct LMF 270 and carrying an indication (the LCS Correlation identifier) that can be recognized by the LMF 270. Second, to enable an AMF 264 to distinguish an LCS Correlation identifier assigned by an LMF 270 (used in this procedure) from an LCS Correlation identifier assigned by the AMF 264**, the two types of LCS Correlation identifier can be selected from different ranges.

At stage 1245, the LMF 270 determines correction terms from the received RLD measurements using the known location of the RLD 710. The LMF 270 stores the correction terms and uses them to correct location measurements from other UEs (e.g., UEs 204).

The LMF 270 repeats stage 1240 whenever new RLD measurements are needed. If the RLD 710 moves to a new AMF 264, the RLD 710 can repeat the registration at stage 1210.

Referring now to the scenario in which an RLD operates as part of a gNB from LMF's perspective. If the RLD can be regarded as part of a gNB from the LMF's perspective (e.g., part of a gNB-DU, TRP), an RLD Registration Procedure as shown in stage 610 of FIG. 6 is not strictly necessary. The "RLD Registration" would be performed by a deployment/operator, similar to the provisioning of gNB information to an LMF (typically via some Operation and Maintenance functionality). The RLDs could be part of the normal gNB/TRP database in an LMF, sometimes referred to as a "Base Station Almanac." Specific RLD information could be requested by an LMF using the TRP Information Exchange procedure as for normal gNBs/TRPs.

In an aspect, the RLD could be defined as an eTRP, which may be part of a gNB-DU or separate, as shown in FIG. 7. The eTRP has essentially inverse functions compared to a normal TRP: The eTRP transmits UL-PRS (a normal TRP transmits DL-PRS), and receives DL-PRS (a normal TRP would receive UL-PRS). One benefit of this solution is that non-UE associated NRPPa procedures can be used, which can avoid the RLD Registration as mentioned above.

Since LPP provides all the functionality for positioning capability transfer, assistance data delivery, and location information transfer, LPP can also be used if the RLD is part of a gNB. The LPP PDU could be transported inside an NRPPa message container. NRPPa would then enable the gNB-CU to perform message routing in agreement with gNB-to-LMF signaling principles. However, the actual positioning message payload can be a LPP PDU, as illustrated in FIG. 13. Specifically, FIG. 13 is a diagram 1300 illustrating an example F1 protocol stack for the support of LPP for eTRPs. Note that in FIG. 13, the acronym "SCTP" means "Stream Control Transmission Protocol."

Figure 14:
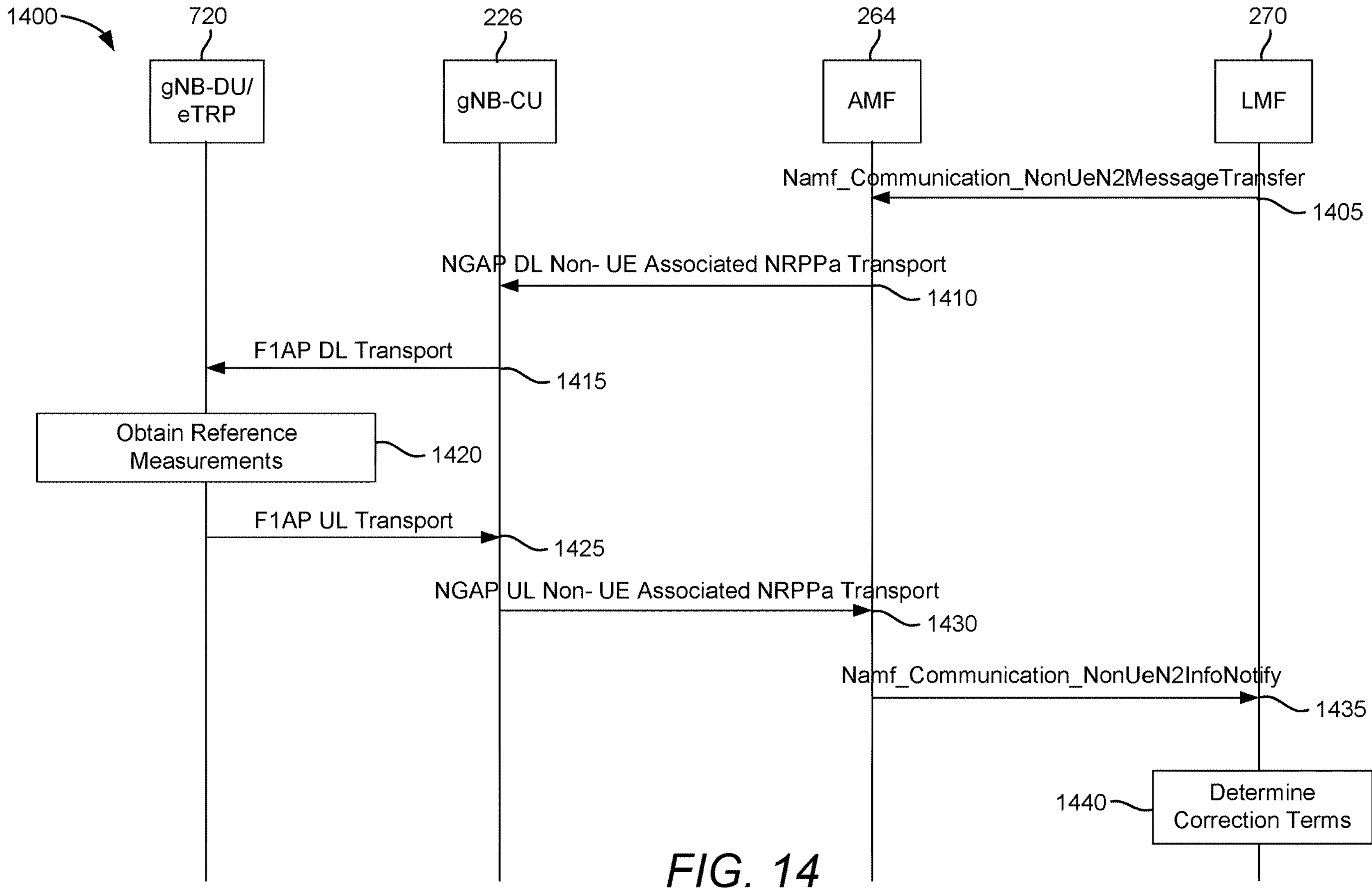
FIG. 14 illustrates an example RLD positioning operation for the scenario in which the RLD operates as part of a base station, according to aspects of the disclosure.

FIG. 14 illustrates an example RLD positioning operation 1400 for the scenario in which the RLD operates as part of a gNB, according to aspects of the disclosure. The RLD positioning operation 1400 includes RLD capability exchange, assistance data delivery, and location information transfer via LPP.

At stage 1405, the LMF 270 invokes the Namf_Communication_NonUeN2MessageTransfer service operation towards the AMF 264 to request the transfer of an NRPPa PDU to an NG-RAN node (gNB-CU 226). The NRPPa message includes an embedded LPP PDU. The LPP PDU may request location information from the RLD 720, provide assistance data to the RLD 720, or query for the RLD 720 capabilities. The service operation includes the target NG-RAN node identity.

At stage 1410, the AMF 264 forwards the NRPPa PDU (which includes an embedded LPP PDU) to the identified gNB-CU 226 in an NGAP Downlink Non-UE Associated NRPPa Transport message and includes a Routing ID identifying the LMF 270.

At stage 1415, the gNB-CU 226 extracts the LPP PDU from the received NRPPa message and forwards the LPP PDU to the identified eTRP 720 in an F1AP downlink Transport container.

At stage 1420, the target eTRP (RLD) 720 extracts the LPP PDU and decodes the LPP message. If the LPP message is of type Request Location Information, the eTRP (RLD) 720 obtains the requested location measurements (e.g., RSTD, RSRP, Rx-Tx time difference measurement).

At stage 1425, the target eTRP (RLD) 720 returns the location information obtained in stage 1420 to the gNB-CU 226 in an F1AP uplink Transport container. The F1AP uplink Transport container includes the LPP PDU.

At stage 1430, the target gNB-CU 226 extracts the LPP PDU from the F1AP message and includes the LPP PDU in an NRPPa message. The gNB-CU 226 then provides the NRPPa PDU (which includes the LPP PDU) to the AMF 264 in an NGAP uplink Non-UE Associated NRPPa Transport message. The gNB-CU 226 also includes the Routing identifier in the NGAP uplink Non-UE Associated NRPPa Transport message received in stage 1410.

At stage 1435, the AMF 264 invokes the Namf_Communication_NonUeN2InfoNotify service operation towards the LMF 270 indicated by the Routing Identifier received in stage 1430. The service operation includes the NRPPa PDU with the embedded LPP PDU received in stage 1430 in the N2 Info Container.

At stage 1440, the LMF 270 determines correction terms from the received RLD measurements using the known location of the RLD 720. The LMF 270 stores the correction terms and uses them to correct location measurements from other UEs.

The LMF repeats stages 1405 to 1435 whenever new Reference Device Measurements are needed. This solution has minimal impact to current positioning procedures and signalling. The additional impact would be to define a new NRPPa and F1AP message that can carry an embedded LPP PDU container.

For the transmission of UL-PRS (SRS), the current NRPPa and F1AP procedures can also be reused. However, for the PDU transport between the LMF 270 and gNB 222, the corresponding messages would also be Non-UE Associated, similar to FIG. 14.

Figure 15:
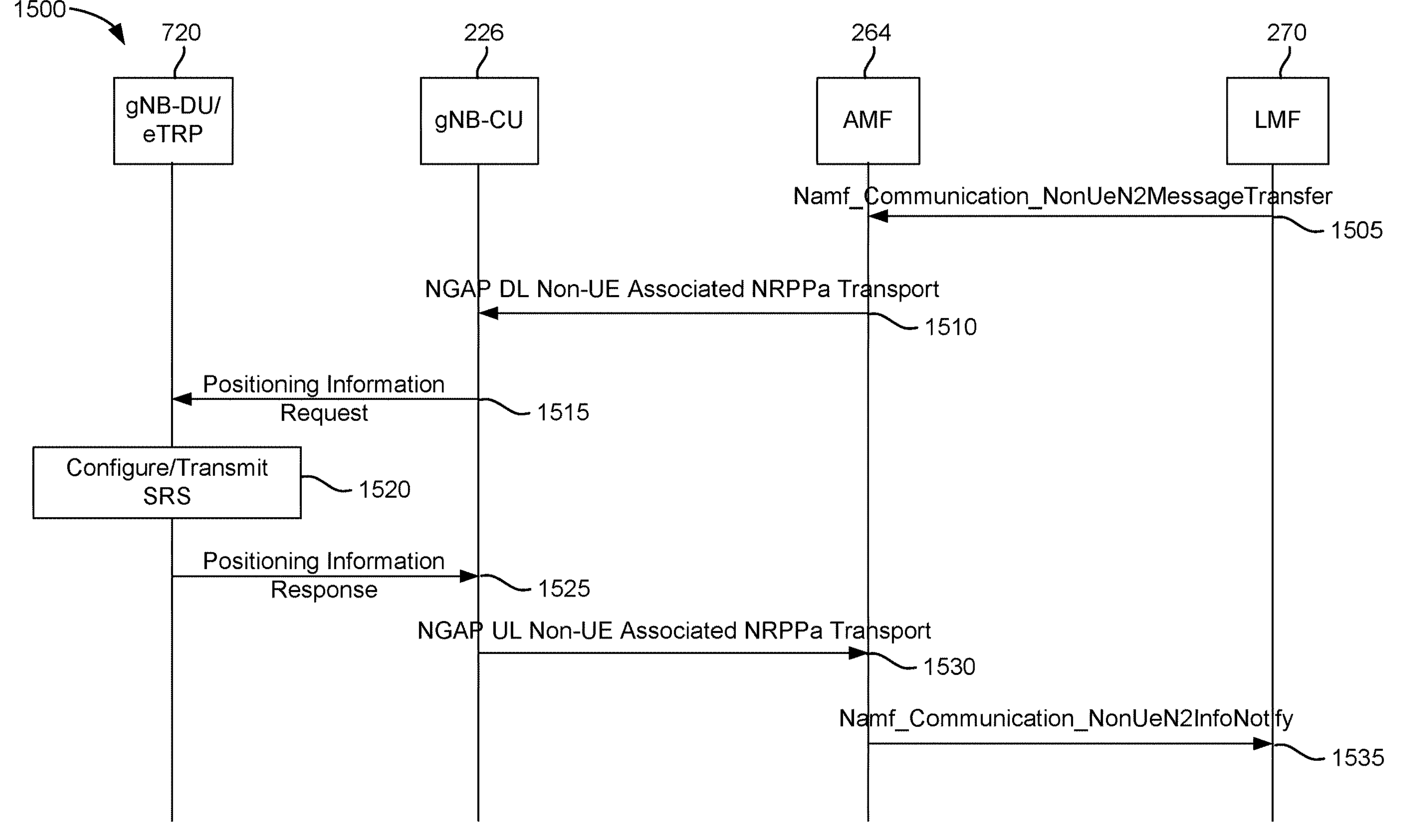
FIG. 15 illustrates an example RLD sounding reference signal (SRS) configuration procedure, according to aspects of the disclosure.

FIG. 15 illustrates an example RLD SRS configuration procedure 1500 to request an SRS configuration/SRS transmission from an eTRP RLD to support uplink positioning reference measurements, according to aspects of the disclosure. In this aspect, the eTRP RLD is configured to transmit UL-PRS (e.g., SRS) to enable gNB-DUs/TRPs to measure the eTRP RLD UL-PRS and report the associated measurements to a location server as part of a standard uplink positioning procedure. Therefore, the uplink positioning measurements of the standard UL positioning procedure (e.g., UL-AoA, RTOA, gNB Rx-Tx time difference measurements) are performed by the gNBs/TRPs using the UL-PRS transmitted by the eTRP RLD at a known location. These uplink measurements can then be compared with measurements that would be expected at the gNB/TRP location from the eTRP RLD at the known RLD location to determine correction terms for nearby UEs.

At stage 1505, the LMF 270 invokes the Namf_Communication_NonUeN2MessageTransfer service operation towards the AMF 264 to request the transfer of an NRPPa PDU. The NRPPa PDU includes a Positioning Information Request message to request eTRP (RLD) 720 SRS configuration information. The message may include the Requested UL-SRS Transmission Characteristics, which provides recommended SRS configuration parameter for the eTRP (RLD) 720. The service operation includes the target NG-RAN node identity.

At stage 1510, the AMF 264 forwards the NRPPa PDU to the identified gNB-CU 226 in an NGAP downlink Non-UE Associated NRPPa Transport message and includes a Routing ID identifying the LMF 270.

At stage 1515, since the NRPPa PDU is received in a Non-UE Associated NRPPa Transport message by the gNB-CU 226, the gNB-CU 226 realizes that the NRPPa Positioning Information Request message is intended for a target eTRP/RLD 720, and not for a normal UE. The NRPPa Positioning Information Request message includes the eTRP ID(s) for the target eTRP(s)/RLD(s) 720. The gNB-CU 226 sends an F1AP Positioning Information Request message to the eTRP(s)/RLD(s) 720 (as indicated in the NRPPa message received in stage 1510) to indicate to the eTRP(s)/RLD(s) 720 the need to transmit SRS and to retrieve the SRS configuration from the eTRP/RLD(s) 720.

At stage 1520, the eTRP/RLD 720 takes the Requested SRS Transmission Characteristics information included in the F1AP Positioning Information Request message into account when determining the SRS configuration. If the Requested SRS Transmission Characteristics indicates a periodic SRS, the eTRP/RLD 720 starts transmitting the SRS. Otherwise (e.g., in case of semi-persistent SRS), the eTRP/RLD 720 waits with the transmission of the SRS until an F1AP Positioning Activation Request message is received using the same general procedure as in FIG. 15 but with the NRPPa PDU at Stages 1505 and 1510 including an NRPPa Positioning Activation Request message to request activation of the SRS, which is provided as an F1AP Positioning Activation Request message to the eTRP/RLD at Stage 1515.

At stage 1525, the target eTRP(s) (RLD(s)) 720 return an F1AP Positioning Information Response message including the configured SRS configuration information to the gNB-CU 226.

At stage 1530, the target gNB-CU 226 encodes the information received at stage 1525 into an NRPPa Positioning Information Response message and provides the NRPPa PDU (including the NRPPa Positioning Information Response message) to the AMF 264 in an NGAP uplink Non-UE Associated NRPPa Transport message. The gNB-CU 226 also includes the Routing identifier in the NGAP uplink Non-UE Associated NRPPa Transport message received in stage 1510.

At stage 1535, the AMF 264 invokes the Namf_Communication_NonUeN2InfoNotify service operation towards the LMF 270 indicated by the Routing Identifier received in stage 1530. The service operation includes the NRPPa PDU with the NRPPa Positioning Information Response message received in stage 1530 in the N2 Info Container.

The same procedure as above can be used for other NRPPa/F1AP messages, such as Positioning Activation Request/Response to activate semi-persistent or trigger aperiodic SRS transmission by the eTRP/RLD 720. Therefore, the current NRPPa and F1AP positioning messages can be reused for RLDs in the case that the RLD is considered part of a gNB (gNB-DU/eTRP). Instead of using UE associated transport procedures for these messages, the Non-UE associated transport mechanism would be used in this solution, which necessitates only small changes to the NRPPa/F1AP messages to include the identities of the target gNB-DU/eTRP 720. Therefore, a dedicated RLD registration procedure would not be necessary, as mentioned above, since the target gNB-DU/eTRP identities can be provisioned to an LMF 270 as part of a Base Station Almanac.

Figure 16:
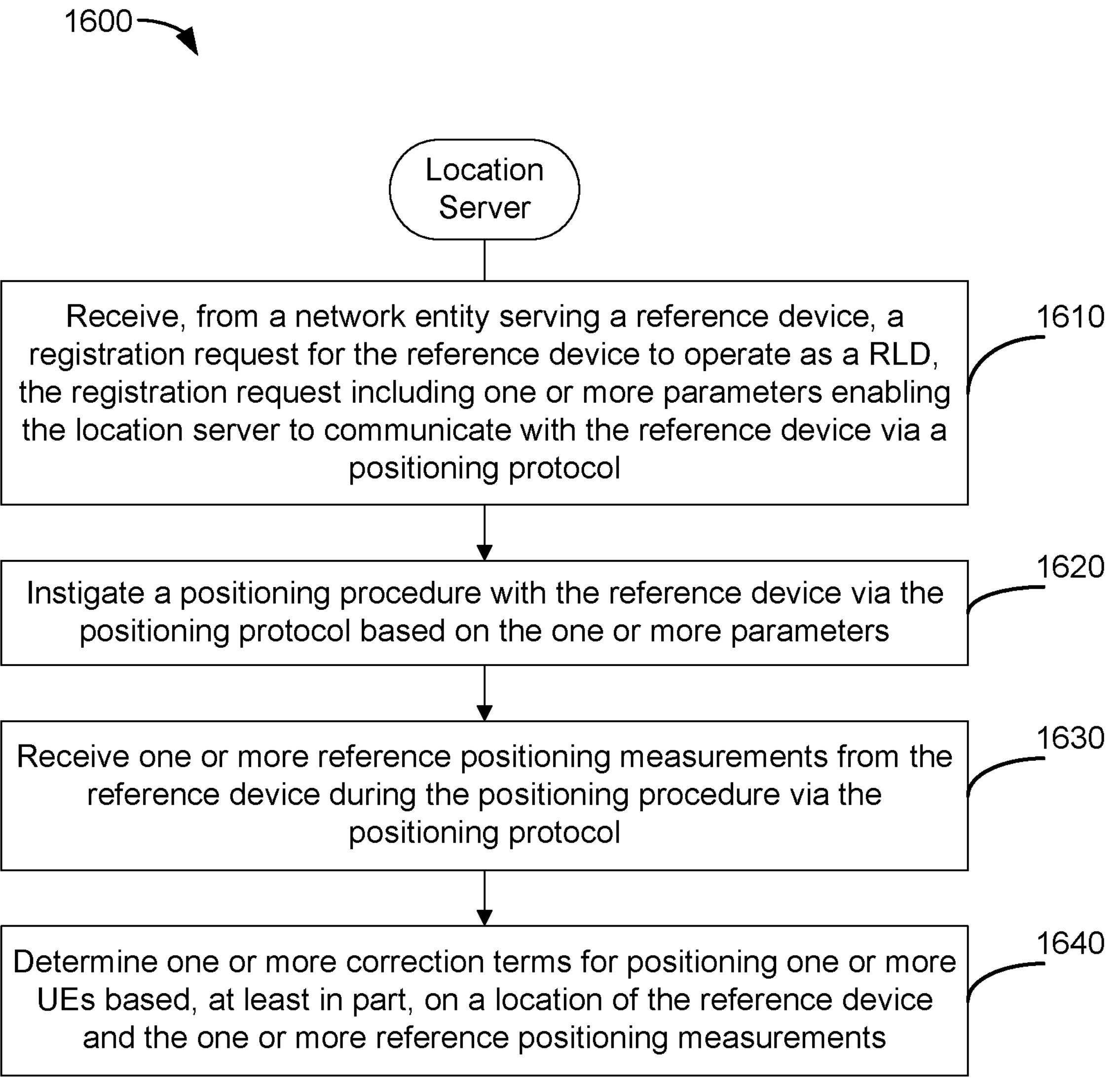
FIGS. 16 to 19 illustrate example methods of communication, according to aspects of the disclosure.

FIG. 16 illustrates an example method 1600 of communication, according to aspects of the disclosure. In an aspect, method 1600 may be performed by a location server (e.g., LMF 270).

At 1610, the location server receives, from a network entity (e.g., AMF 264) serving a reference device (e.g., RLD 710), a registration request for the reference device to operate as an RLD, as at stages 920 and 1215. In an aspect, the registration request includes one or more parameters enabling the location server to communicate with the reference device via a positioning protocol (e.g., LPP). In an aspect, operation 1610 may be performed by the at least one network interface 390, the at least one processor 394, memory component 396, and/or positioning component 398, any or all of which may be considered means for performing this operation.

At 1620, the location server instigates a positioning procedure with the reference device via the positioning protocol based on the one or more parameters, as at stages **965*a* and 1240*a*. In an aspect, operation 1620 may be performed by the at least one network interface 390, the at least one processor 394, memory component 396, and/or positioning component 398**, any or all of which may be considered means for performing this operation.

At 1630, the location server receives one or more reference positioning measurements from the reference device during the positioning procedure via the positioning protocol, as at stages **965*a* and 1240*a*. In an aspect, operation 1630 may be performed by the at least one network interface 390, the at least one processor 394, memory component 396, and/or positioning component 398**, any or all of which may be considered means for performing this operation.

At 1640, the location server determines one or more correction terms for positioning one or more UEs (e.g., UEs 204) based, at least in part, on a location of the reference device and the one or more reference positioning measurements, as at stages 970 and 1245. In an aspect, operation 1640 may be performed by the at least one network interface 390, the at least one processor 394, memory component 396, and/or positioning component 398, any or all of which may be considered means for performing this operation.

Figure 17:
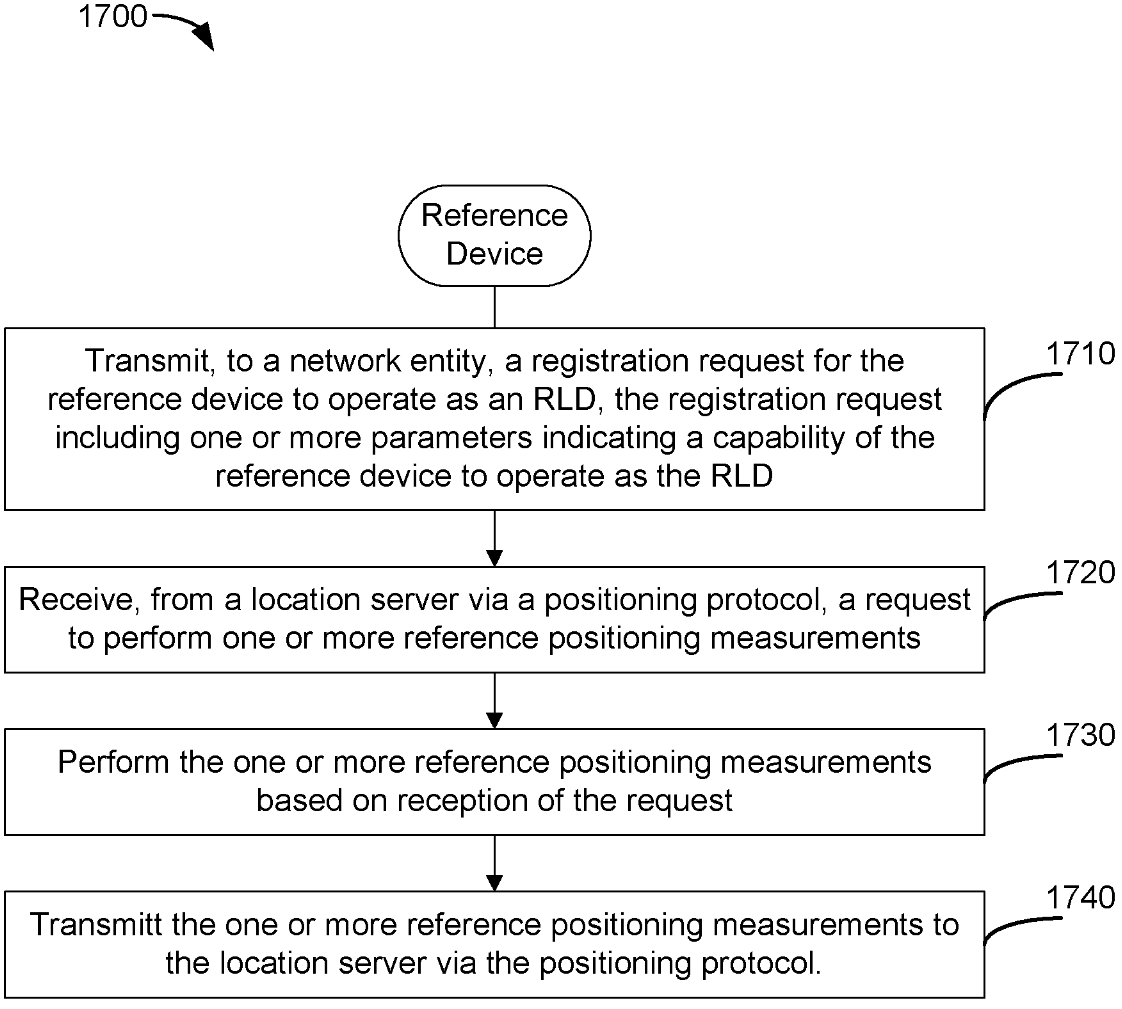

FIG. 17 illustrates an example method 1700 of communication, according to aspects of the disclosure. In an aspect, method 1700 may be performed by a reference device (e.g., RLD 710).

At 1710, the reference device transmits, to a network entity (e.g., AMF 264), a registration request for the reference device to operate as an RLD, as at stages 905 and 1210. In an aspect, the registration request includes one or more parameters indicating a capability of the reference device to operate as the RLD. In an aspect, operation 1710 may be performed by the at least one WWAN transceiver 310, the at least one processor 332, memory component 340, and/or positioning component 342, any or all of which may be considered means for performing this operation.

At 1720, the reference device receives, from a location server via a positioning protocol (e.g., LPP), a request to perform one or more reference positioning measurements, as at stages **965*a* and 1240*a*. In an aspect, operation 1720 may be performed by the at least one WWAN transceiver 310, the at least one processor 332, memory component 340, and/or positioning component 342**, any or all of which may be considered means for performing this operation.

At 1730, the reference device performs the one or more reference positioning measurements based on reception of the request, as at stages **965*a* and 1240*a*. In an aspect, operation 1730 may be performed by the at least one WWAN transceiver 310, the at least one processor 332, memory component 340, and/or positioning component 342**, any or all of which may be considered means for performing this operation.

At 1740, the reference device transmits the one or more reference positioning measurements to the location server via the positioning protocol, as at stages **965*a* and 1240*a*. In an aspect, operation 1740 may be performed by the at least one WWAN transceiver 310, the at least one processor 332, memory component 340, and/or positioning component 342**, any or all of which may be considered means for performing this operation.

Figure 18:
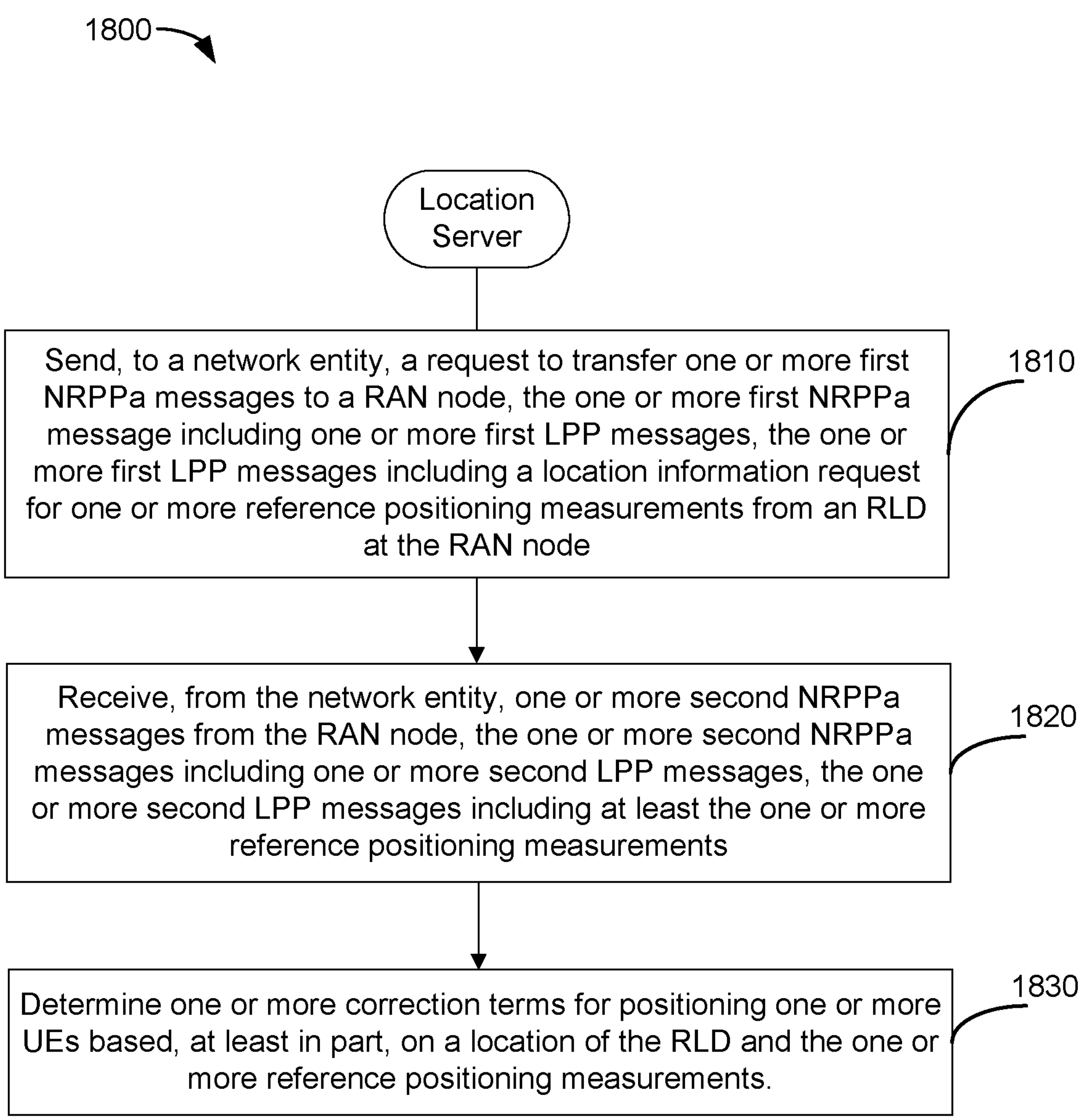

FIG. 18 illustrates an example method 1800 of communication, according to aspects of the disclosure. In an aspect, method 1800 may be performed by a location server (e.g., LMF 270).

At 1810, the location server sends, to a network entity (e.g., AMF 264), a request to transfer one or more first NRPPa messages to a RAN node (e.g., gNB 222, gNB-CU 226, gNB-DU 228), as at stages 1405 and 1505. In an aspect, the one or more first NRPPa message include one or more first LPP messages, the one or more first LPP messages including a location information request for one or more reference positioning measurements from an RLD (e.g., RLD 720) at the RAN node. In an aspect, operation 1810 may be performed by the at least one network interface 390, the at least one processor 394, memory component 396, and/or positioning component 398, any or all of which may be considered means for performing this operation.

At 1820, the location server receives, from the network entity, one or more second NRPPa messages from the RAN node, as at stages 1435 and 1535. In an aspect, the one or more second NRPPa messages including one or more second LPP messages, the one or more second LPP messages including at least the one or more reference positioning measurements. In an aspect, operation 1820 may be performed by the at least one network interface 390, the at least one processor 394, memory component 396, and/or positioning component 398, any or all of which may be considered means for performing this operation.

At 1830, the location server determines one or more correction terms for positioning one or more UEs based, at least in part, on a location of the RLD and the one or more reference positioning measurements, as at stage 1440. In an aspect, operation 1830 may be performed by the at least one network interface 390, the at least one processor 394, memory component 396, and/or positioning component 398, any or all of which may be considered means for performing this operation.

Figure 19:
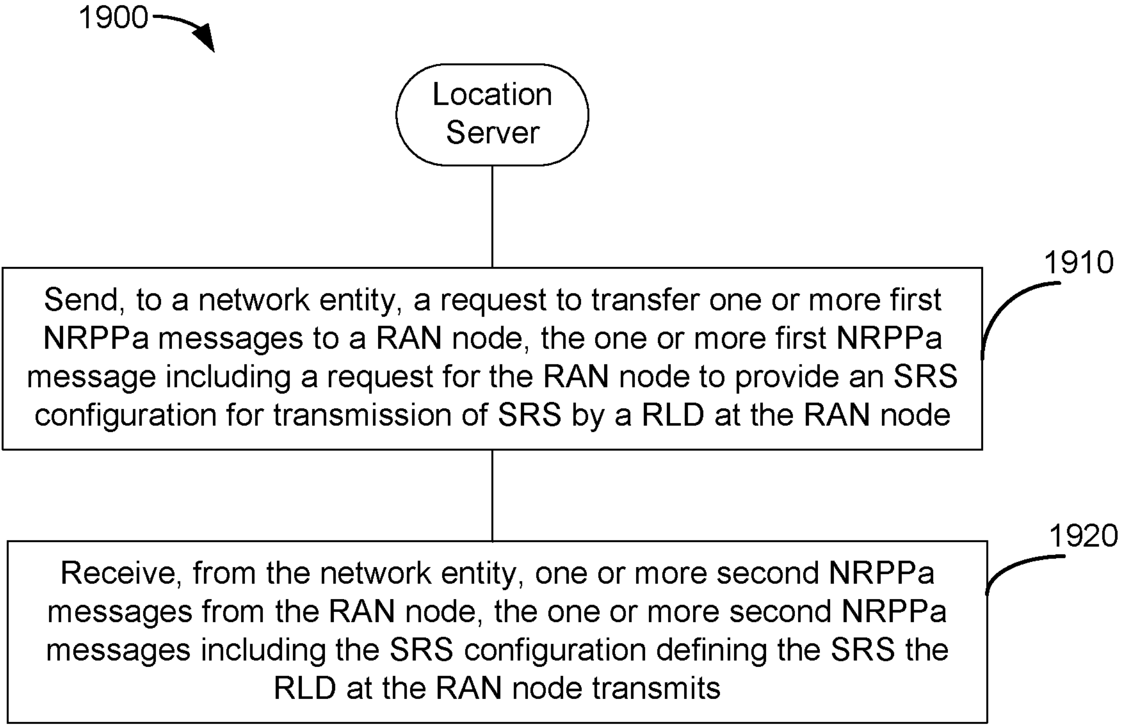

FIG. 19 illustrates an example method 1900 of communication, according to aspects of the disclosure. In an aspect, method 1900 may be performed by a location server (e.g., LMF 270).

At 1910, the location server sends, to a network entity, a request to transfer one or more first NRPPa messages to a RAN node, the one or more first NRPPa message including a request for the RAN node to provide an SRS configuration for transmission of SRS by a RLD at the RAN node. In an aspect, operation 1910 may be performed by the at least one network interface 390, the at least one processor 394, memory component 396, and/or positioning component 398, any or all of which may be considered means for performing this operation.

At 1920, the location server receives, from the network entity, one or more second NRPPa messages from the RAN node, the one or more second NRPPa messages including the SRS configuration defining the SRS the RLD at the RAN node transmits. In an aspect, operation 1920 may be performed by the at least one network interface 390, the at least one processor 394, memory component 396, and/or positioning component 398, any or all of which may be considered means for performing this operation.

As will be appreciated, a technical advantage of the methods 1600 to 1900 is to enable signaling between a location server (e.g., LMF 270) and an RLD (e.g., RLD 710, 720), thereby taking advantage of the use of RLDs, which allow obtaining reference measurements to correct UE positioning measurements, thereby improving positioning performance.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of communication performed by a location server, comprising: receiving, from a network entity serving a reference device, a registration request for the reference device to operate as a reference location device (RLD), the registration request including one or more parameters enabling the location server to communicate with the reference device via a positioning protocol; instigating a positioning procedure with the reference device via the positioning protocol based on the one or more parameters; receiving one or more reference positioning measurements from the reference device during the positioning procedure via the positioning protocol; and determining one or more correction terms for positioning one or more user equipments (UEs) based, at least in part, on a location of the reference device and the one or more reference positioning measurements.

Clause 2. The method of clause 1, wherein the one or more parameters include: an identifier of the reference device, an identifier of the network entity, an identifier of a serving cell of the reference device, a location services (LCS) correlation identifier, a subscription permanent identifier (SUPI) of the reference device, a permanent equipment identifier (PEI) of the reference device, or any combination thereof.

Clause 3. The method of clause 2, wherein the LC S correlation identifier is set to a routing identifier associated with the location server.

Clause 4. The method of any of clauses 1 to 3, wherein the registration request further includes one or more parameters indicating a capability of the reference device to operate as the RLD.

Clause 5. The method of clause 4, wherein the one or more parameters indicating the capability of the reference device to operate as the RLD include: the location of the reference device, an uncertainty of the location, a location source for the location, a velocity of the reference device, whether the reference device is in a fixed or mobile motion state, whether the reference device is battery powered or mains-operated, or any combination thereof.

Clause 6. The method of any of clauses 4 to 5, wherein the one or more parameters indicating the capability of the reference device to operate as the RLD comprise a flag (e.g., a one-bit field) indicating whether the reference device can operate as the RLD.

Clause 7. The method of any of clauses 1 to 6, further comprising: registering the reference device as the RLD by storing an LCS correlation identifier and an identifier of the network entity.

Clause 8. The method of any of clauses 1 to 7, further comprising: sending a registration response to the network entity, the registration response indicating whether the reference device was successfully registered as the RLD.

Clause 9. The method of any of clauses 1 to 8, wherein the location server instigates the positioning procedure with the reference device based on a determination that the one or more reference positioning measurements are needed for positioning the one or more UEs.

Clause 10. The method of any of clauses 1 to 9, further comprising: applying the one or more correction terms to positioning measurements received from the one or more UEs.

Clause 11. The method of any of clauses 1 to 10, wherein the reference device comprises: a mobile UE, a UE dedicated to operating as the RLD, a mobile terminal (MT) of an integrated access and backhaul (IAB) node, or an MT of a smart repeater.

Clause 12. The method of any of clauses 1 to 11, wherein the positioning protocol is a Long-Term Evolution (LTE) positioning protocol (LPP).

Clause 13. The method of any of clauses 1 to 12, wherein: the location server is a location management function (LMF), and the network entity is an access and mobility management function (AMF).

Clause 14. A method of communication performed by a reference device, comprising: transmitting, to a network entity, a registration request for the reference device to operate as a reference location device (RLD), the registration request including one or more parameters indicating a capability of the reference device to operate as the RLD; receiving, from a location server via a positioning protocol, a request to perform one or more reference positioning measurements; performing the one or more reference positioning measurements based on reception of the request; and transmitting the one or more reference positioning measurements to the location server via the positioning protocol.

Clause 15. The method of clause 14, wherein the one or more parameters indicating the capability of the reference device to operate as the RLD include: a location of the reference device, an uncertainty of the location, a location source for the location, a velocity of the reference device, whether the reference device is in a fixed or mobile motion state, whether the reference device is battery powered or mains-operated, or any combination thereof.

Clause 16. The method of any of clauses 14 to 15, wherein the one or more parameters indicating the capability of the reference device to operate as the RLD comprise a flag indicating whether the reference device can operate as the RLD.

Clause 17. The method of any of clauses 14 to 16, wherein the registration request is included in a radio resource control (RRC) setup complete message.

Clause 18. The method of any of clauses 14 to 16, wherein the registration request is included in a non-access stratum (NAS) uplink transport message.

Clause 19. The method of clause 18, wherein the registration request comprises a supplementary services LCS reference device registration request.

Clause 20. The method of any of clauses 14 to 19, further comprising: receiving a registration response from the location server, the registration response indicating whether the reference device was successfully registered as the RLD.

Clause 21. The method of any of clauses 14 to 20, wherein the reference device comprises: a mobile UE, a UE dedicated to operating as the RLD, a mobile terminal (MT) of an integrated access and backhaul (IAB) node, or an MT of a smart repeater.

Clause 22. The method of any of clauses 14 to 21, wherein the positioning protocol is a Long-Term Evolution (LTE) positioning protocol (LPP).

Clause 23. The method of any of clauses 14 to 22, wherein: the location server is a location management function (LMF), and the network entity is an access and mobility management function (AMF).

Clause 24. A method of communication performed by a location server, comprising: sending, to a network entity, a request to transfer one or more first New Radio positioning protocol type A (NRPPa) messages to a radio access network (RAN) node, the one or more first NRPPa message including one or more first Long-Term Evolution (LTE) positioning protocol (LPP) messages, the one or more first LPP messages including a location information request for one or more reference positioning measurements from a reference location device (RLD) at the RAN node; receiving, from the network entity, one or more second NRPPa messages from the RAN node, the one or more second NRPPa messages including one or more second LPP messages, the one or more second LPP messages including at least the one or more reference positioning measurements; and determining one or more correction terms for positioning one or more user equipments (UEs) based, at least in part, on a location of the RLD and the one or more reference positioning measurements.

Clause 25. The method of clause 24, wherein: the one or more first NRPPa messages comprise one or more first NRPPa protocol data units (PDUs), the one or more second NRPPa messages comprise one or more second NRPPa PDUs, the one or more first LPP messages comprise one or more first LPP PDUs, and the one or more second LPP messages comprise one or more second LPP PDUs.

Clause 26. The method of any of clauses 24 to 25, wherein the one or more first NRPPa messages and the one or more second NRPPa messages are part of a non-UE associated NRPPa transport procedure.

Clause 27. The method of any of clauses 24 to 26, wherein: the RLD is an enhanced transmission-reception point (eTRP), and the eTRP transmits sounding reference signals (SRS) and receives positioning reference signals (PRS).

Clause 28. The method of any of clauses 24 to 27, wherein the one or more first LPP messages include the location information request, assistance data for the RLD, a query for RLD capabilities of the RLD, a request for an SRS configuration of the RLD, or any combination thereof.

Clause 29. The method of any of clauses 24 to 28, wherein the location server sends the request to the network entity based on the RAN node being registered at the location server as the RLD.

Clause 30. The method of any of clauses 24 to 29, further comprising: applying the one or more correction terms to positioning measurements received from the one or more UEs.

Clause 31. The method of any of clauses 24 to 30, wherein the RLD comprises: a New Radio Node B (gNB), a gNB central unit (gNB-CU), a gNB distributed unit (gNB-DU), or an eTRP.

Clause 32. The method of any of clauses 24 to 31, wherein: the location server is a location management function (LMF), and the network entity is an access and mobility management function (AMF).

Clause 33. A method of communication performed by a location server, comprising: sending, to a network entity, a request to transfer one or more first New Radio positioning protocol type A (NRPPa) messages to a radio access network (RAN) node, the one or more first NRPPa message including a request for the RAN node to provide a sounding reference signals (SRS) configuration for transmission of SRS by a reference location device (RLD) at the RAN node; and receiving, from the network entity, one or more second NRPPa messages from the RAN node, the one or more second NRPPa messages including the SRS configuration defining the SRS the RLD at the RAN node transmits.

Clause 34. The method of clause 33, further comprising: instigating an uplink positioning procedure with one or more RAN nodes not operating as RLDs, wherein the one or more RAN nodes measure the SRS from the RLD at the RAN node to determine uplink positioning measurements.

Clause 35. The method of clause 34, further comprising: determining one or more correction terms for positioning one or more UEs based, at least in part, on locations of the one or more RAN nodes and the one or more uplink positioning measurements.

Clause 36. The method of any of clauses 33 to 35, wherein the one or more first NRPPa messages and the one or more second NRPPa messages are part of a non-UE associated NRPPa transport procedure.

Clause 37. The method of any of clauses 33 to 36, wherein the RLD comprises: a New Radio Node B (gNB), a gNB central unit (gNB-CU), a gNB distributed unit (gNB-DU), or an enhanced transmission-reception point (eTRP).

Clause 38. The method of any of clauses 33 to 37, wherein: the location server is a location management function (LMF), and the network entity is an access and mobility management function (AMF).

Clause 39. An apparatus comprising a memory, a communication interface, and at least one processor communicatively coupled to the memory and the communication interface, the memory, the communication interface, and the at least one processor configured to perform a method according to any of clauses 1 to 38.

Clause 40. An apparatus comprising means for performing a method according to any of clauses 1 to 38.

Clause 41. A non-transitory computer-readable medium storing computer-executable instructions, the computer-executable comprising at least one instruction for causing a computer or processor to perform a method according to any of clauses 1 to 38.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of communication performed by a reference device, comprising:

transmitting, to a network entity, a registration request for the reference device to operate as a reference location device (RLD), the registration request including one or more parameters indicating a capability of the reference device to operate as the RLD;

receiving a registration response from the location server, the registration response indicating whether the reference device was successfully registered as the RLD;

receiving, from a location server via a positioning protocol, a request to perform one or more reference positioning measurements;

performing the one or more reference positioning measurements based on reception of the request; and transmitting the one or more reference positioning measurements to the location server via the positioning protocol.

2. The method of claim 1, wherein the one or more parameters indicating the capability of the reference device to operate as the RLD include:

a location of the reference device, an uncertainty of the location, a location source for the location, a velocity of the reference device, whether the reference device is in a fixed or mobile motion state, whether the reference device is battery powered or mains-operated, or any combination thereof.

3. The method of claim 1, wherein the one or more parameters indicating the capability of the reference device to operate as the RLD comprise a flag indicating whether the reference device can operate as the RLD.

4. The method of claim 1, wherein the registration request is included in a radio resource control (RRC) setup complete message.

5. The method of claim 1, wherein the registration request is included in a non-access stratum (NAS) uplink transport message.

6. The method of claim 5, wherein the registration request comprises a supplementary services location service (LCS) reference device registration request.

7. The method of claim 1, wherein when the registration response indicates that the reference device was successfully registered as the RLD, performing the receiving of the request to perform one or more reference positioning measurements.

8. The method of claim 1, wherein the reference device comprises:

a mobile UE, a UE dedicated to operating as the RLD, a mobile terminal (MT) of an integrated access and backhaul (IAB) node, or an MT of a smart repeater.

9. The method of claim 1, wherein the positioning protocol is a Long-Term Evolution (LTE) positioning protocol (LPP).

10. The method of claim 1, wherein:

the location server is a location management function (LMF), and the network entity is an access and mobility management function (AMF).

* * * * *